(12) United States Patent
Kidani et al.

(10) Patent No.: US 12,022,113 B2
(45) Date of Patent: Jun. 25, 2024

(54) IMAGE DECODING DEVICE WITH BLOCK MOTION COMPENSATOR AND DETERMINATION MECHANISM

(71) Applicant: KDDI CORPORATION, Tokyo (JP)

(72) Inventors: Yoshitaka Kidani, Fujimino (JP); Kei Kawamura, Fujimino (JP); Kyohei Unno, Fujimino (JP); Sei Naito, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 557 days.

(21) Appl. No.: 17/183,788

(22) Filed: Feb. 24, 2021

(65) Prior Publication Data

US 2021/0185354 A1 Jun. 17, 2021

Related U.S. Application Data

(63) Continuation of application No. PCT/JP2019/041873, filed on Oct. 25, 2019.

(30) Foreign Application Priority Data

Dec. 28, 2018 (JP) .................................. 2018-246858

(51) Int. Cl.
  *H04N 19/583* (2014.01)
  *H04N 19/105* (2014.01)
  (Continued)

(52) U.S. Cl.
  CPC ......... *H04N 19/583* (2014.11); *H04N 19/105* (2014.11); *H04N 19/139* (2014.11); *H04N 19/176* (2014.11); *H04N 19/52* (2014.11)

(58) Field of Classification Search
  CPC ............... H04N 19/583; H04N 19/105; H04N 19/139; H04N 19/176; H04N 19/52;
  (Continued)

(56) References Cited

U.S. PATENT DOCUMENTS

| 9,883,203 B2 | 1/2018 | Chien et al. |
| 10,326,988 B2 | 6/2019 | Park et al. |
| 2013/0128974 A1 | 5/2013 | Chien et al. |
| 2016/0219302 A1* | 7/2016 | Liu ...................... H04N 19/583 |

FOREIGN PATENT DOCUMENTS

| JP | 2015-502094 A | 1/2015 |
| JP | 2016-184936 A | 10/2016 |
| JP | 6169091 B | 7/2017 |
| WO | 2016/123068 A1 | 8/2016 |

OTHER PUBLICATIONS

Chen et al., Algorithm Description of Joint Exploration Test Model 7 (JEM 7), JVET-G1001 (Jul. 2017).
(Continued)

*Primary Examiner* — Siamak Harandi
(74) *Attorney, Agent, or Firm* — Troutman Pepper Hamilton Sanders LLP

(57) ABSTRACT

An image decoding device includes: a motion compensation predictor configured to generate a prediction image signal of a prediction target block based on information about a motion vector in a unit of the block and a reference frame; an overlapped block motion compensator carrying out an overlapped block motion compensation process of correcting the prediction image signal of the prediction target block by subjecting the prediction image signal of the prediction target block and a prediction image signal generated based on information about a motion vector and a reference frame of an adjacent block of the prediction target block to weighted averaging; and a determinater determining whether the overlapped block motion compensation process is applied to the prediction target block or not. The determinater determines application of the overlapped block motion compensation process to the prediction target block, when unidirectional prediction is applied to the adjacent block.

5 Claims, 15 Drawing Sheets

(51) Int. Cl.
*H04N 19/139* (2014.01)
*H04N 19/176* (2014.01)
*H04N 19/52* (2014.01)

(58) Field of Classification Search
CPC .... H04N 19/109; H04N 19/136; H04N 19/86; H04N 19/159
See application file for complete search history.

(56) References Cited

OTHER PUBLICATIONS

ITU-T H.265 High Efficiency Video Coding, 692 pages (Feb. 2018).
Lin, Z. Y et al., CEI0-related: OBMC bandwidth reduction and line buffer reduction, Joint Video Experts Team (JVET) of ITU-T SG 16 WP 3 and ISO/IEC JTC 1/SC 29/WG 11, JVET-K0259-v2, 11th Meeting: Ljubljana, SI, Jul. 2018, pp. 1-11, 1 Introduction, 2 Proposed methods.
Lin, Z. Y. et al., CEI0.2.1: Uni-prediction-based CU-boundary-only OBMC, Joint Video Experts Team (JVET) of ITU-T SG 16 WP 3 and ISO/IEC JTC 1/SC 29/WG 11, JVET-M0178-v2, 13th Meeting: Marrakech, MA, Jan. 2019, pp. 1-7, 2. Proposed methods.
Kidani, Yoshitaka et al., CEI0-related: Reduction of the worst-case memory bandwidth and operation number of OBMC, Joint Video Experts Team (JVET) of ITU-T SG 16 WP 3 and ISO/IEC JTC 1/SC 29/WG 11, JVET-M0357-v4, 13th Meeting: Marrakech, MA, Jan. 2019, pp. 1-10, 1 Introductions, 2 Proposed method cited.
International Search Report issued in corresponding International Patent Application No. PCT/JP2019/041873 dated Jan. 21, 2020, with English translation.
Notice of Reasons for Refusal dated Jan. 31, 2023, from corresponding Japanese Application No. 2022-004524.

* cited by examiner

FIG. 12

| LONG SIDE→ SHORT SIDE↓ | 4 | 8 | 16 | 32 | 64 | 128 |
|---|---|---|---|---|---|---|
| 4 | NOT APPLICABLE | | | | | |
| 8 | | | | | UNIDIRECTIONAL | |
| 16 | | | | | | |
| 32 | | | | | | |
| 64 | | | | | | |
| 128 | | | | | | |

FIG. 13

| WIDTH→ HEIGHT↓ | 4 | 8 | 16 | 32 | 64 | 128 |
|---|---|---|---|---|---|---|
| 4 | NOT APPLICABLE | | | | | |
| 8 | | | | UNIDIRECTIONAL | | |
| 16 | | | | | | |
| 32 | | | | | | |
| 64 | | | | | | |
| 128 | | | | | | |

| PREDICTION TARGET BLOCK (PREDICTION TARGET SUB BLOCK) | | | ADJACENT BLOCK (ADJACENT SUB BLOCK) | | |
|---|---|---|---|---|---|
| $C_p$ | $L_{p0}$ | $L_{p1}$ | $C_n$ | $L_{n0}$ | $L_{n1}$ |
| 5 | 4 | 6 | 5 | 0 | 8 |
| .... | .... | .... | .... | .... | .... |
| | | | | | |
| | | | | | |
| | | | | | |

FIG. 23

| CONDITIONS OF TWO BLOCKS BETWEEN WHICH BLOCK BOUNDARY IS INTERPOSED | BS VALUE OF HEVC | CORRECTED BS VALUE IN OBMC APPLICATION |
|---|---|---|
| AT LEAST ONE OF BLOCKS IS IN-SCREEN PREDICTION BLOCK (CONDITION 1) | 2 | 2 |
| AT LEAST ONE OF BLOCKS HAS NON-ZERO ORTHOGONAL TRANSFORM COEFFICIENT AND CONVERSION BLOCK BOUNDARY (CONDITION 2) | 1 | 1 |
| ABSOLUTE VALUE OF DIFFERENCE BETWEEN TWO BLOCK MOTION VECTORS BETWEEN WHICH BOUNDARY IS INTERPOSED IS 1 PIXEL OR MORE (CONDITION 3) | 1 | 0 |
| REFERENCE IMAGES OF MOTION COMPENSATION OF TWO BLOCKS BETWEEN WHICH BOUNDARY IS INTERPOSED ARE DIFFERENT, OR THE NUMBER OF MOTION VECTORS IS DIFFERENT (CONDITION 4) | 1 | 0 |
| OTHER THAN ABOVE DESCRIPTION | 0 | 0 |

IMAGE DECODING DEVICE WITH BLOCK MOTION COMPENSATOR AND DETERMINATION MECHANISM

CROSS-REFERENCE TO RELATED APPLICATIONS

The present application is a continuation based on PCT Application No. PCT/JP2019/041873, filed on Oct. 25, 2019, which claims the benefit of Japanese patent application No. 2018-246858, filed on Dec. 28, 2018. The content of which is incorporated by reference herein in their entirety.

TECHNICAL FIELD

The present invention relates to an image decoding device, an image coding device, an image processing system, and a program.

BACKGROUND

Algorithm Description of Joint Exploration Test Model 7 (JEM 7) discloses a technique called overlapped block motion compensation (OBMC: Overlapped Block Motion Compensation). OBMC is a technique of subjecting reference pixel values indicated by motion vectors of a prediction target block and an adjacent block to weighted averaging based on a weight coefficient matrix set in advance in a prediction pixel generating process of motion compensation prediction to generate final prediction pixels.

Also, JP 2016-184936 A describes a technique of determining applicability of OBMC based on the size of a prediction target block, the type of prediction directions (unidirectional prediction or bidirectional prediction), or accuracy of motion vectors in order to reduce the memory bandwidth in a case in which OBMC is applied.

Furthermore, JP 6169091 B2 describes a technique of correcting a bS value, which is a parameter of determining the intensity of a deblocking filter in a case in which OBMC is applied to a boundary between a plurality of prediction target blocks in an encoding target block. According to the techniques, if a smoothing effect has already implemented to the boundary between the prediction target block by application of OBMC, an unnecessary filter effect caused by the deblocking filter can be avoided.

However, OBMC disclosed in Algorithm Description of Joint Exploration Test Model 7 (JEM 7) has a problem that the memory bandwidth and the number of times of calculations required in application of OBMC are increased since the OBMC is configured to carry out application regardless of the size of the prediction target block or the adjacent block and the type of the prediction directions.

Also, OBMC disclosed in JP 2016-184936 A has a problem that the memory bandwidth and the number of times of calculations required in the case in which OBMC is applied sometimes exceed the memory bandwidth and the number of times of calculations required in the case in which OBMC is not applied, and it is also conceivable that encoding performance is lowered since the number of blocks to which OBMC is applied is reduced by an unintentional scale.

Furthermore, JP 6169091 B2 discloses correction of the bS value, which is used in intensity determination of the deblocking filter in the case in which OBMC is applied. However, there has been a problem that only a plurality of prediction target block boundaries in an encoding target block are application targets of OBMC.

Therefore, the present invention has been accomplished in view of the above described problems, and it is an object to provide an image decoding device, an image encoding device, an image decoding method, and a program capable of suppressing increase in the memory bandwidth and the number of times of calculations required in OBMC application and realizing improvement in encoding performance by adding determination (restriction) to application conditions of OBMC based on the size of the prediction target block, the type of the prediction directions, and the type of the prediction direction of the adjacent block.

SUMMARY

The first aspect of the present invention is summarized as an image decoding device configured to decode an image signal including a plurality of blocks, the image decoding device including: a first circuit that generates a prediction image signal of a prediction target block based on information about a motion vector in a unit of the block and a reference frame; a second circuit that carries out an overlapped block motion compensation process of correcting the prediction image signal of the prediction target block by subjecting the prediction image signal of the prediction target block and a prediction image signal generated based on information about a motion vector and a reference frame of an adjacent block of the prediction target block to weighted averaging; and a third circuit that determines whether the overlapped block motion compensation process is to be applied to the prediction target block or not, wherein the third circuit determines to apply the overlapped block motion compensation process to the prediction target block, when unidirectional prediction is applied to the adjacent block.

The second aspect of the present invention is summarized as an image decoding device configured to decode an image signal including a plurality of blocks, the image decoding device including: a first circuit that generates a prediction image signal of a prediction target block based on information about a motion vector in a unit of the block and a reference frame; a second circuit that carries out an overlapped block motion compensation process of correcting the prediction image signal of the prediction target block by subjecting the prediction image signal of the prediction target block and a prediction image signal generated based on information about a motion vector and a reference frame of an adjacent block of the prediction target block to weighted averaging; and a third circuit that controls a type of a prediction direction applied to the adjacent block based on a size of the prediction target block to determine whether the overlapped block motion compensation process is to be applied to the prediction target block or not.

The third aspect of the present invention is summarized as an image decoding device configured to decode an image signal including a plurality of blocks, the image decoding device including: a first circuit that generates a prediction image signal of a prediction target block based on information about a motion vector in a unit of the block and a reference frame; a second circuit that carries out an overlapped block motion compensation process of correcting the prediction image signal of the prediction target block by subjecting the prediction image signal of the prediction target block and a prediction image signal generated based on information about a motion vector and a reference frame of an adjacent block of the prediction target block to weighted averaging; and a third circuit that determines whether the overlapped block motion compensation process is to be applied to the prediction target block or not, wherein the third circuit controls a number of overlapped block motion compensation tap or a number of a type of a prediction direction of the adjacent block based on a size of the prediction target block to determine whether the overlapped block motion compensation process is to be applied to the prediction target block or not.

The fourth aspect of the present invention is summarized as an image decoding device configured to decode an image signal including a plurality of blocks, the image decoding device including: a first circuit that generates a prediction image signal of a prediction target block based on information about a motion vector in a unit of the block and a reference frame; a second circuit that carries out an overlapped block motion compensation process of correcting the prediction image signal of the prediction target block by subjecting the prediction image signal of the prediction target block and a prediction image signal generated based on information about a motion vector and a reference frame of an adjacent block of the prediction target block to weighted averaging; and a third circuit that determines whether the overlapped block motion compensation process is to be applied to the prediction target block or not, wherein the third circuit converts a prediction method applied to the adjacent block from bidirectional prediction to unidirectional prediction by a predetermined method when the bidirectional prediction is applied to the adjacent block.

The fifth aspect of the present invention is summarized as an image decoding device configured to decode an image signal including a plurality of blocks, the image decoding device including: a first circuit that generates a prediction image signal of a prediction target block based on information about a motion vector in a unit of the block and a reference frame; a second circuit that carries out an overlapped block motion compensation process of correcting the prediction image signal of the prediction target block by subjecting the prediction image signal of the prediction target block and a prediction image signal generated based on information about a motion vector and a reference frame of an adjacent block of the prediction target block to weighted averaging; and a third circuit that determines whether the overlapped block motion compensation process is to be applied to the prediction target block or not, wherein the second circuit changes a weight value of a weight coefficient matrix used in the weighted averaging based on a number of the adjacent block or a size of the prediction target block.

The sixth aspect of the present invention is summarized as an image decoding device configured to decode an image signal including a plurality of blocks, the image decoding device including: a first circuit that generates a prediction image signal of a prediction target block based on information about a motion vector in a unit of the block and a reference frame; a second circuit that carries out an overlapped block motion compensation process of correcting the prediction image signal of the prediction target block by subjecting the prediction image signal of the prediction target block and a prediction image signal generated based on information about a motion vector and a reference frame of an adjacent block of the prediction target block to weighted averaging; and a third circuit determines whether the overlapped block motion compensation process is to be applied to the prediction target block or not, wherein the second circuit changes an application condition of a deblocking filter based on whether the overlapped block motion compensation process is to be applied or not.

The seventh aspect of the present invention is summarized as an image decoding device configured to decode an image signal including a plurality of blocks, the image decoding device including: a first circuit that generates a prediction image signal of a prediction target block based on information about a motion vector in a unit of the block and a reference frame; a second circuit that carries out an overlapped block motion compensation process of correcting the prediction image signal of the prediction target block by subjecting the prediction image signal of the prediction target block and a prediction image signal generated based on information about a motion vector and a reference frame of an adjacent block of the prediction target block to weighted averaging; and a third circuit that determines whether the overlapped block motion compensation process is to be applied to the prediction target block or not, wherein the first circuit reduces, by a predetermined reducing method, a number of a motion vector and a reference frame required in the overlapped block motion compensation process when the motion vector of the prediction target block and the motion vector of the adjacent block are different.

The eighth aspect of the present invention is summarized as an image encoding device configured to encode an image signal including a plurality of blocks to generate encoded data, the image encoding device including: a first circuit that generates a prediction image signal of a prediction target block based on information about a motion vector in a unit of the block and a reference frame; a second circuit that carries out an overlapped block motion compensation process of correcting the prediction image signal of the prediction target block by subjecting the prediction image signal of the prediction target block and a prediction image signal generated based on information about a motion vector and a reference frame of an adjacent block of the prediction target block to weighted averaging; and a third circuit that determines whether the overlapped block motion compensation process is to be applied to the prediction target block or not, wherein the third circuit determines to apply the overlapped block motion compensation process to the prediction target block if unidirectional prediction is applied to the adjacent block.

The ninth aspect of the present invention is summarized as an image decoding method of decoding an image signal including a plurality of blocks, the image decoding method including: a process A of generating a prediction image signal of a prediction target block based on information about a motion vector in a unit of the block and a reference frame; a process B of carrying out an overlapped block motion compensation process of correcting the prediction image signal of the prediction target block by subjecting the prediction image signal of the prediction target block and a prediction image signal generated based on information about a motion vector and a reference frame of an adjacent block of the prediction target block to weighted averaging; and a process C of determining whether the overlapped block motion compensation process is to be applied to the prediction target block or not, wherein in the process C, determination to apply the overlapped block motion compensation process to the prediction target block if unidirectional prediction is applied to the adjacent block is carried out.

The tenth aspect of the present invention is summarized as a program that causes a computer to function as an image decoding device configured to decode an image signal including a plurality of blocks, wherein the image decoding device includes: a first circuit that generates a prediction image signal of a prediction target block based on information about a motion vector in a unit of the block and a reference frame; a second circuit that carries out an overlapped block motion compensation process of correcting the prediction image signal of the prediction target block by subjecting the prediction image signal of the prediction target block and a prediction image signal generated based on information about a motion vector and a reference frame of an adjacent block of the prediction target block to weighted averaging; and a third circuit that determines whether the overlapped block motion compensation process is to be applied to the prediction target block or not, wherein the third circuit determines to apply the overlapped block motion compensation process to the prediction target block if unidirectional prediction is applied to the adjacent block.

According to the present invention, it is possible to provide an image decoding device, an image encoding device, an image decoding method, and a program capable of suppressing increase in the memory bandwidth and the number of times of calculations required in OBMC application and realizing improvement in encoding performance by adding determination (restriction) to application conditions of OBMC based on the size of the prediction target block, the type of the prediction directions, and the type of the prediction direction of the adjacent block.

BRIEF DESCRIPTION OF DRAWINGS

FIG. 12 is a diagram illustrating an example of a table used in a modification example.

FIG. 13 is a diagram illustrating an example of the table used in a modification example.

FIG. 23 is a diagram for describing an embodiment.

DETAILED DESCRIPTION

Figure 1:
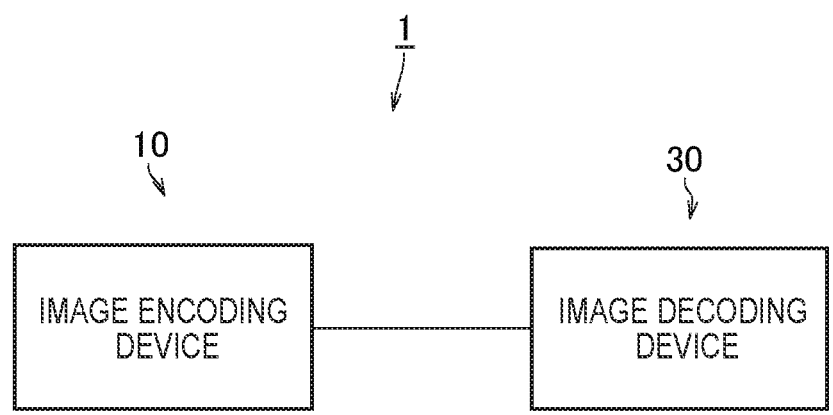
FIG. 1 is a diagram illustrating an example of a configuration of the image processing system 1 according to an embodiment.

Hereinafter, an image processing system 1 according to embodiments of the present invention will be described with reference to FIG. 1. FIG. 1 is a diagram illustrating the image processing system 1 according to the present embodiment.

As illustrated in FIG. 1, the image processing system 1 according to the present embodiment has an image encoding device 10 and an image decoding device 30.

The image encoding device 10 is configured to generate encoded data by encoding input image signals. The image decoding device 30 is configured to generate output image signals by decoding the encoded data.

The encoded data may be transmitted via a transmission path from the image encoding device 10 to the image decoding device 30. The encoded data may be stored in a storage medium and then provided from the image encoding device 10 to the image decoding device 30.

Figure 2:
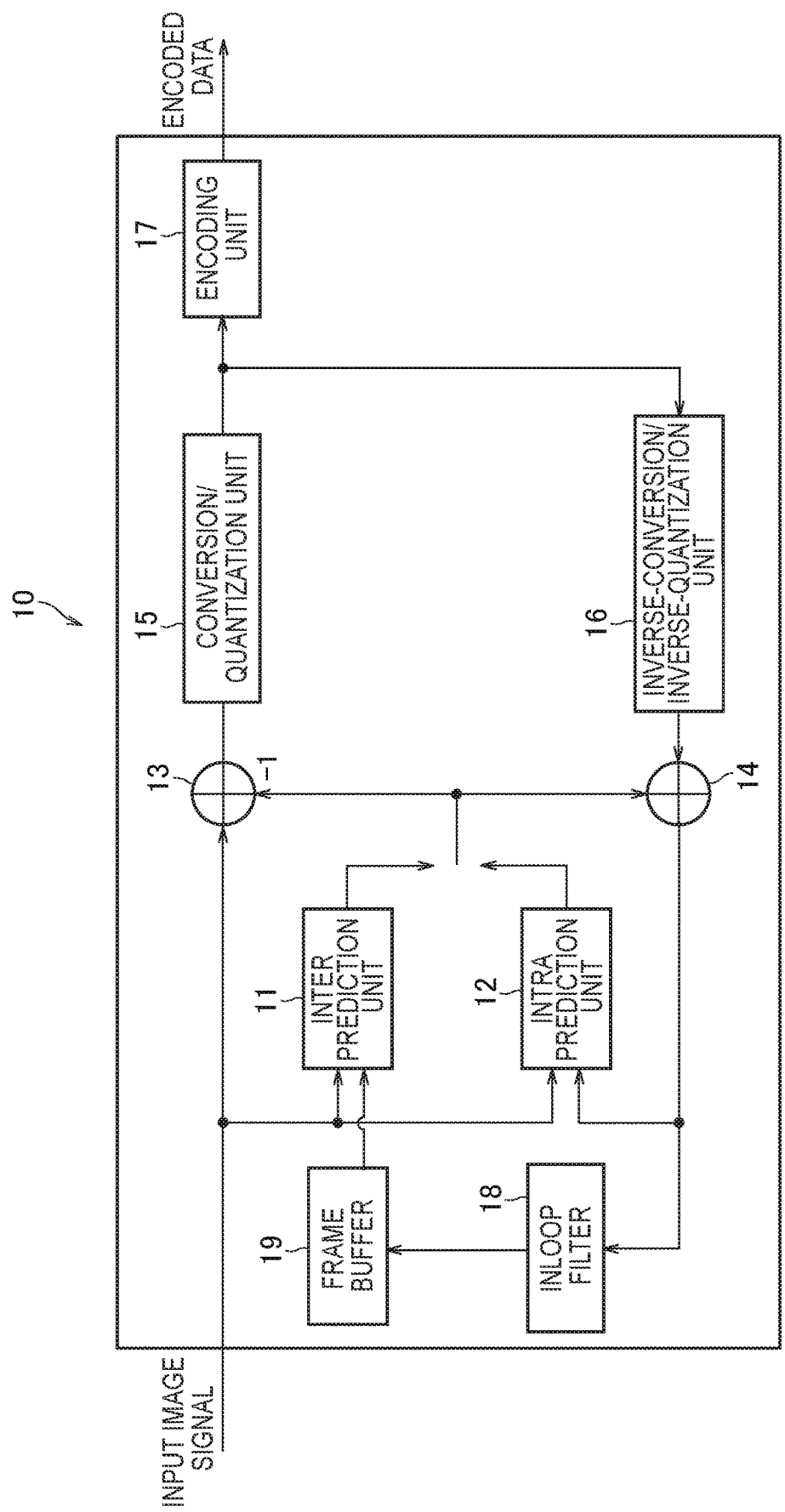
FIG. 2 is a diagram illustrating an example of functional blocks of an image encoding device 10 according to an embodiment.

Hereinafter, the image encoding device 10 according to the present embodiment will be described with reference to FIG. 2. FIG. 2 is a diagram illustrating the image encoding device according to the present embodiment.

As illustrated in FIG. 2, the image encoding device 10 has an inter prediction unit 11, an intra prediction unit 12, a subtractor 13, an adder 14, a conversion/quantization unit 15, an inverse-conversion/inverse-quantization unit 16, an encoding unit 17, an in-loop filter 18, and a frame buffer 19.

The inter prediction unit 11 is configured to generate prediction image signals by inter prediction (inter-frame prediction).

Specifically, the inter prediction unit 11 is configured to compare an encoding target frame (hereinafter, target frame) with a reference frame stored in the frame buffer 19 to specify a reference unit included in the reference frame and determine a motion vector of a prediction target block (prediction unit, for example, PU: Prediction Unit) with respect to the specified reference unit.

Herein, the reference frame is a frame which is different from the target frame. Also, the reference unit is a block referenced regarding the prediction target block.

Also, the inter prediction unit 11 is configured to generate the prediction image signal for each prediction target block based on the prediction target block and the motion vector. The inter prediction unit 11 is configured to output the prediction image signal to the subtractor 13 and the adder 14.

The intra prediction unit 12 is configured to generate prediction image signals by intra prediction (intra-frame prediction).

Specifically, the intra prediction unit 12 is configured to specify the reference unit included in the target frame and generate the prediction image signal for each prediction target block based on the specified reference unit. Also, the intra prediction unit 12 is configured to output the prediction image signal to the subtractor 13 and the adder 14.

For example, the reference unit is a block (adjacent block) adjacent to the prediction target block.

The subtractor 13 is configured to subtract the prediction image signal from the input image signal to generate a prediction residual signal, which is the difference between the input image signal and the prediction image signal, and output the prediction residual signal to the conversion/quantization unit 15.

The adder 14 is configured to add the prediction image signal, which is output from an inter prediction unit 11 or an intra prediction unit 12, to the prediction residual signal, which is output from the inverse-conversion/inverse-quantization unit 16, to generate a pre-filter decoding signal and output the pre-filter decoding signal to the intra prediction unit 12 and the in-loop filter 18.

Herein, the pre-filter decoding signal constitutes a reference unit used in the intra prediction unit 12.

The conversion/quantization unit 15 is configured to carry out a conversion process with respect to the input prediction residual signal to acquire a coefficient level value. Furthermore, the conversion/quantization unit 15 may be configured to carry out quantization of the coefficient level value.

Herein, the conversion process is a process of converting the above described prediction residual signal to a frequency component signal. Note that, in the conversion process, a basis pattern (conversion matrix) corresponding to discrete cosine transform (DCT: Discrete Cosine Transform) may be used, or a basis pattern (conversion matrix) corresponding to discrete sine transform (DCT: Discrete Sine Transform) may be used.

The inverse-conversion/inverse-quantization unit 16 is configured to carry out an inverse conversion process with respect to the coefficient level value output from the conversion/quantization unit 15. Herein, the inverse-conversion/inverse-quantization unit 16 may be configured to carry out inverse quantization of the coefficient level value before the inverse conversion process.

Herein, the inverse conversion process and the inverse quantization are carried out by opposite procedure of the conversion process and the quantization carried out in the conversion/quantization unit 15.

The encoding unit 17 is configured to encode the coefficient level value, which has been output from the conversion/quantization unit 15, to generate encoded data and output the encoded data.

For example, this encoding is entropy encoding in which codes having different lengths are allocated based on the probability of the coefficient level value.

Also, the encoding unit 17 is configured to encode control data used in a decoding process of the image decoding device 30 in addition to the coefficient level value.

Herein, the control data may include size data such as a size of an encoding target unit (CU: Coding Unit), a size of a prediction target block, or a size of a conversion unit (TU: Transform Unit).

The in-loop filter 18 is configured to generate a post-filter decoding signal by subjecting the pre-filter decoding signal output from the adder 14 to a filter process and output the post-filter decoding signal to the frame buffer 19.

For example, the filter process is a deblocking filter process of reducing a distortion(s) generated in a boundary part of a block (prediction target block or conversion unit).

The frame buffer 19 is configured to accumulate the reference frame used in the inter prediction unit 11.

Herein, the post-filter decoding signal constitutes the reference frame used in the inter prediction unit 11.

Figure 3:
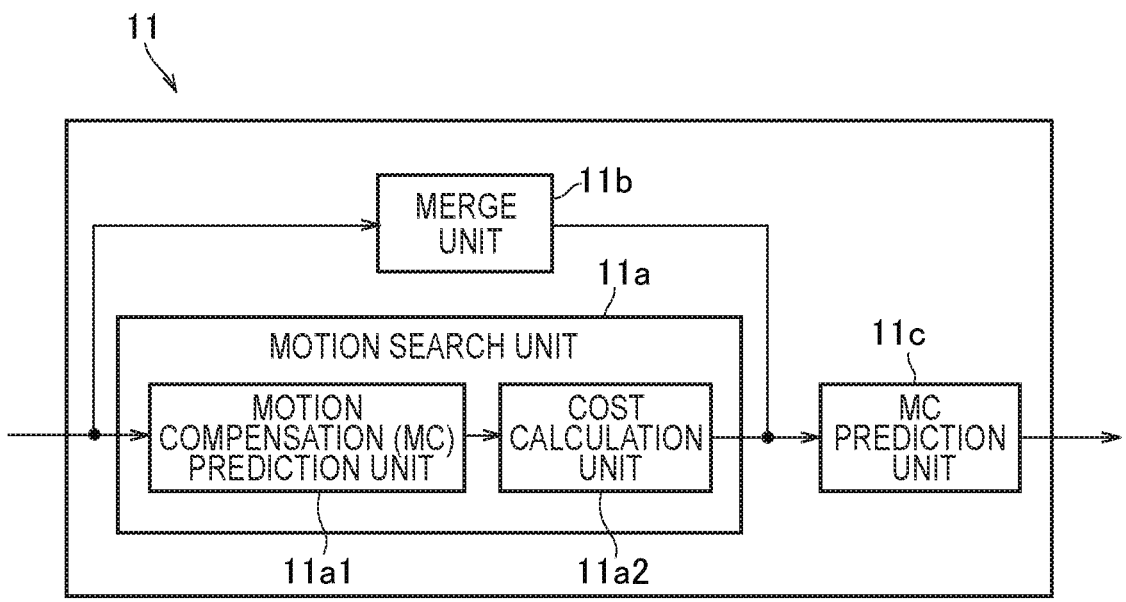
FIG. 3 is a diagram illustrating an example of functional blocks of an inter prediction unit 11 of the image encoding device 10 according to an embodiment.

Hereinafter, with reference to FIG. 3, the inter prediction unit 11 of the image encoding device 10 according to the present embodiment will be described. FIG. 3 is a diagram illustrating the inter prediction unit 11 according to the present embodiment.

As illustrated in FIG. 3, the inter prediction unit 11 has a motion search unit 11a, a merge unit 11b, a motion compensation prediction unit (hereinafter, MC prediction unit) 11c.

The motion search unit 11a is configured to use the motion vector of the input image signal (original image), the reference frame (reconfigured image) stored in the frame buffer 19, or an adjacent block of the prediction target block as input and determine a motion vector and a reference frame for each prediction target block.

For example, specifically, the motion search unit 11a has a motion compensation (MC) prediction unit (first circuit) 11a1 and a cost calculation unit 11a2.

The motion compensation (MC) prediction unit 11a1 is configured to generate the prediction image signal with respect to the input image signal corresponding to the prediction target block while changing the reference frame and a reference position in the reference frame.

The cost calculation unit 11a2 is configured to determine the reference position (in other words, motion vector) and the reference frame at which the cost of the prediction image signal generated by the motion compensation prediction unit 11a1 and the input image signal is minimum and the code amount difference from the motion vector of the adjacent block is minimum.

Herein, as a cost function used in the cost calculation unit 11a2, for example, the sum of squared error (SSE: Sum of Squared Error) or the sum of absolute difference (SAD: Sum of Absolute Difference) is conceivable, and the cost calculation unit 11a2 is configured to appropriately select which cost function is to be used based on calculation load.

The image encoding device 10 is configured to superimpose the information about the motion vector and the reference frame determined by the cost calculation unit 11a2 on encoded data and transmit the information to the image decoding device 30.

The merge unit 11b is configured to determine a merge candidate (motion vector) with respect to the prediction target block from the input image signal and the reference frame and the motion vector of the adjacent block stored in the frame buffer 19.

The image encoding device 10 is configured to superimpose the information about the merge candidate, which has been determined by the merge unit 11b, on the encoded data and transmit the information to the image decoding device 30.

Figure 4:
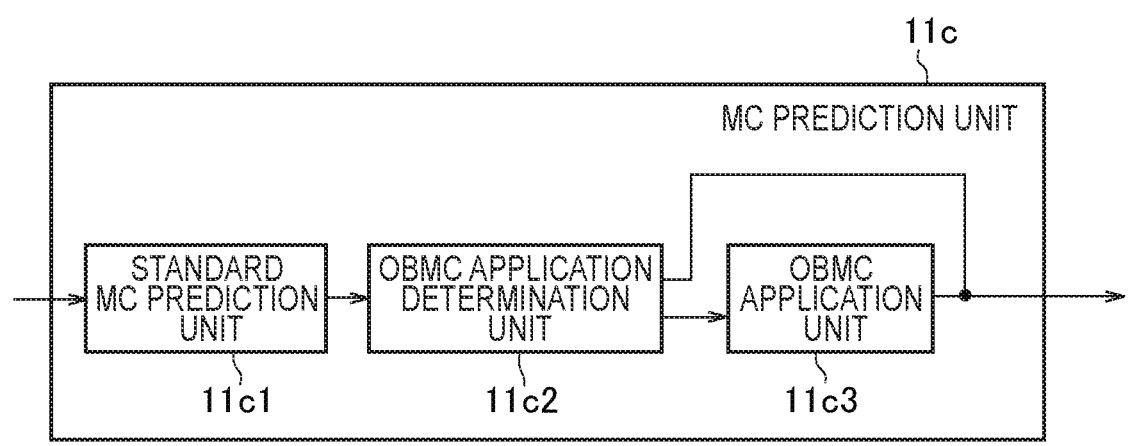
FIG. 4 is a diagram illustrating an example of functional blocks of a MC prediction unit 11c of the inter prediction unit 11 of the image encoding device 10 according to an embodiment.

Hereinafter, with reference to FIG. 4, the MC prediction unit 11c of the inter prediction unit 11 of the image encoding device 10 according to the present embodiment will be described. FIG. 4 is a diagram illustrating the MC prediction unit 11c of the inter prediction unit 11 of the image encoding device 10 according to the present embodiment.

As illustrated in FIG. 4, the MC prediction unit 11c has a standard motion compensation prediction unit (standard MC prediction unit) 11c1, an OBMC application determination unit (third circuit) 11c2, and an OBMC application unit (second circuit) 11c3.

Herein, the MC prediction unit 11c is configured to output the prediction image signal (prediction pixel values) based on the information about the motion vector and the reference frame (reference image list and reference image index) from the motion search unit 11a or the information about the merge candidate from the merge unit 11b. Note that the output prediction image signal changes depending on whether OBMC is applied or not.

Also, the MC prediction unit 11c is configured to determine the applicability of OBMC based on an OBMC application determination flag if the OBMC application determination flag is transmitted from the image encoding device 10.

Specifically, the standard MC prediction unit 11c1 is configured to generate the prediction image signal of the prediction target block based on the motion vector of a block unit and the reference frame.

The OBMC application determination unit 11c2 is configured to determine whether OBMC is to be applied to the prediction target block or not. Herein, the OBMC application determination unit 11c2 is configured to output the prediction image signal, which has been generated by the standard MC prediction unit 11c1, without change if it is determined that OBMC is not to be applied.

On the other hand, the OBMC application unit 11c3 is configured to apply OBMC to the prediction target block and output the generated prediction image signal if it is determined to apply OBMC. Herein, the image encoding device 10 is configured to superimpose the OBMC application determination flag on the encoded data and transmit the data to the image decoding device 30 if OBMC is to be applied.

Note that a specific method to determine whether OBMC is to be applied or not and an application method of OBMC will be described later.

Figure 5:
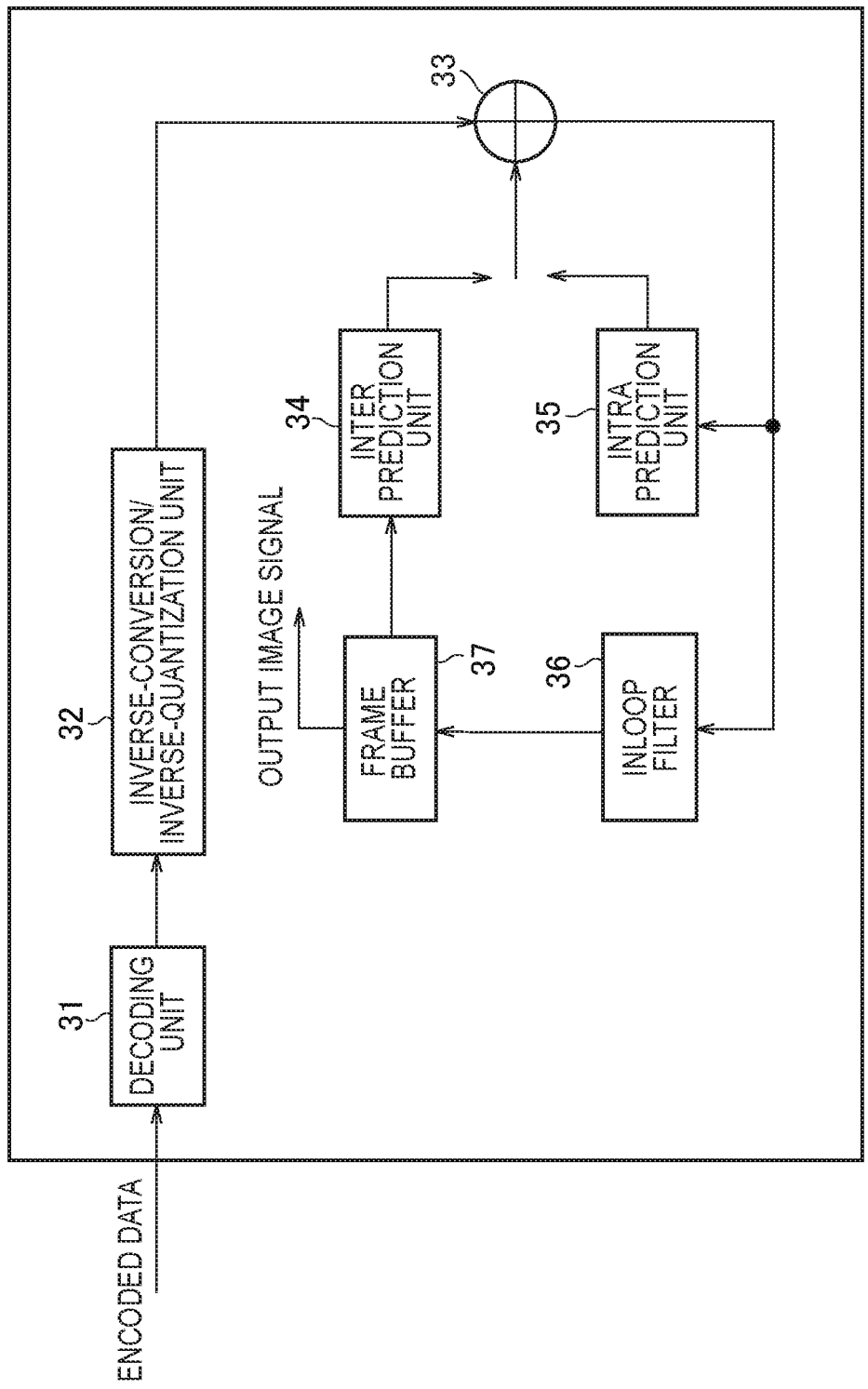
FIG. 5 is a diagram illustrating an example of functional blocks of the image decoding device 30 according to an embodiment.

Hereinafter, with reference to FIG. 5, the image decoding device 30 according to the present embodiment will be described. FIG. 5 is a diagram illustrating the image decoding device according to the present embodiment.

As illustrated in FIG. 5, the image decoding device 30 has a decoding unit 31, an inverse-conversion/inverse-quantization unit 32, an adder 33, an inter prediction unit 34, an intra prediction unit 35, an in-loop filter 36, and a frame buffer 37.

The decoding unit 31 is configured to decode the encoded data generated by the image encoding device 10 and decode the coefficient level value.

Herein, for example, the decoding is entropy decoding having an opposite procedure of the entropy encoding, which is carried out in the encoding unit 17 of the image encoding device 10.

Also, the decoding unit 31 may be configured to acquire the control data by a decoding process of the encoded data.

As described above, the control data may include size data such as the size of the encoding unit, the size of the prediction target block, or the size of the conversion unit. Also, the control data may include an information element indicating an input source used in generation of a prediction sample of a second component. Herein, the second component indicates, for example, a color difference signal other than a brightness signal constituting an image signal.

The inverse-conversion/inverse-quantization unit 32 is configured to carry out an inverse conversion process with respect to the coefficient level value output from the decoding unit 31. Note that the inverse-conversion/inverse-quantization unit 32 may be configured to carry out inverse quantization of the coefficient level value before the inverse conversion process.

Herein, the inverse conversion process and the inverse quantization are carried out by opposite procedure of the conversion process and the quantization carried out in the conversion/quantization unit 15.

The adder 33 is configured to add the prediction image signal to the prediction residual signal, which has been output from the inverse-conversion/inverse-quantization unit 32, to generate a pre-filter decoding signal and output the pre-filter decoding signal to the intra prediction unit 35 and the in-loop filter 36.

Herein, the pre-filter decoding signal constitutes a reference unit used in the intra prediction unit 35.

The inter prediction unit 34 is configured to generate a prediction image signal by inter prediction (inter-frame prediction) as well as the inter prediction unit 11 of the image encoding device 10.

Specifically, the inter prediction unit 34 is configured to compare an encoding target frame with a reference frame stored in the frame buffer 37 to specify a reference unit included in the reference frame and determine a motion vector of a prediction target block with respect to the specified reference unit.

Herein, the inter prediction unit 34 is configured to generate the prediction image signal for each prediction target block based on the prediction target block and the motion vector. The inter prediction unit 34 is configured to output the prediction image signal to the adder 33.

The intra prediction unit 35 is configured to generate a prediction image signal by intra prediction (intra-frame prediction) as well as the intra prediction unit 12 of the image encoding device 10.

Specifically, the intra prediction unit 35 is configured to specify the reference unit included in the encoding target frame and generate the prediction image signal for each prediction target block based on the specified reference unit. The intra prediction unit 35 is configured to output the prediction image signal to the adder 33.

The in-loop filter 36 is configured to generate a post-filter decoding signal by subjecting the pre-filter decoding signal output from the adder 33 to a filter process and output the post-filter decoding signal to the frame buffer 37 as well as the in-loop filter 18 of the image encoding device 10.

For example, the filter process is a deblocking filter process of reducing a distortion(s) generated in a boundary part of a block (prediction target block or conversion unit).

The frame buffer 37 is configured to accumulate the reference frame used in the inter prediction unit 34 as well as the frame buffer 19 of the image encoding device 10.

Herein, the post-filter decoding signal constitutes the reference frame used in the inter prediction unit 11.

(About Inter Prediction Unit 34)

Figure 6:
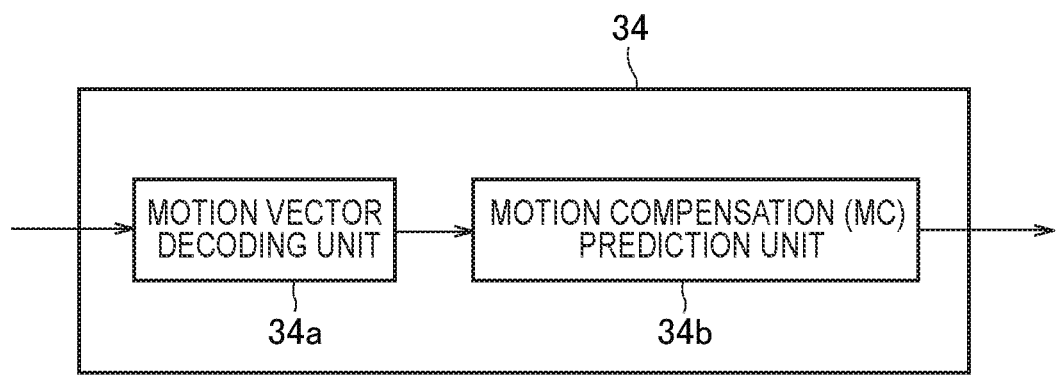
FIG. 6 is a diagram illustrating an example of functional blocks of an inter prediction unit 34 of the image decoding device 30 according to an embodiment.

Hereinafter, with reference to FIG. 6, the inter prediction unit 34 of the image decoding device 30 according to the present embodiment will be described. FIG. 6 is a diagram illustrating the inter prediction unit 34 of the image decoding device 30 according to the present embodiment.

As illustrated in FIG. 6, the inter prediction unit 34 has a motion vector decoding unit 34a and a motion compensation (MC) prediction unit (first circuit) 34b.

The motion vector decoding unit 34a is configured to decode the information (reference image list and reference image index) about the motion vector and the reference frame of each block superimposed on the encoded data, the information about the merge candidate, and the OBMC application determination flag and output that to the MC prediction unit 34b.

The MC prediction unit 34b is configured to receive the information about the motion vector and the reference frame and the information about the merge candidate decoded by the motion vector decoding unit 34a as input, generate output image signals (prediction pixel values), and output the signals.

Figure 7:
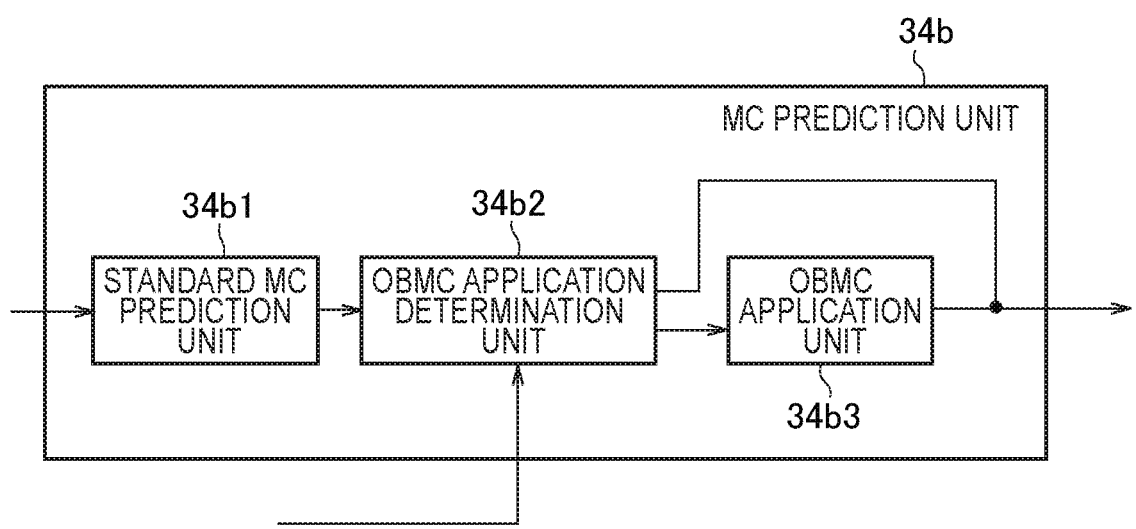
FIG. 7 is a diagram illustrating an example of functional blocks of the MC prediction unit 34b of the inter prediction unit 34 of the image decoding device 30 according to an embodiment.

Hereinafter, with reference to FIG. 7, the MC prediction unit 34b of the inter prediction unit 34 of the image decoding device 30 according to the present embodiment will be described. FIG. 7 is a diagram illustrating the MC prediction unit 34b of the inter prediction unit 34 of the image decoding device 30 according to the present embodiment.

As illustrated in FIG. 7, the MC prediction unit 34b has a standard motion compensation prediction unit (standard MC prediction unit) 34b1, an OBMC application determination unit (third circuit) 34b2, and an OBMC application unit (second circuit) 34b3.

The MC prediction unit 34b is configured to generate prediction image signals (prediction pixel values) based on the information (reference image list and reference image index) about the motion vector and the reference frame, the information about the merge candidate, and the OBMC application determination flag from the motion vector decoding unit 34a and output the signals. Note that the output prediction image signal changes depending on whether OBMC is applied or not.

Specifically, the standard MC prediction unit 34b1 is configured to generate the prediction image signal of the prediction target block based on the information about the motion vector of the block unit and the reference frame.

The OBMC application determination unit 34b2 is configured to determine whether OBMC is to be applied to the prediction target block or not. Herein, the OBMC application determination unit 34b2 is configured to output the prediction image signal, which has been generated by the standard MC prediction unit 34b1, without change if it is determined that OBMC is not to be applied.

On the other hand, the OBMC application unit 34b3 is configured to apply OBMC to the prediction target block and output the generated prediction image signal if it is determined to apply OBMC.

Note that a specific method to determine whether OBMC is to be applied or not and an application method of OBMC will be described later.

The OBMC application unit 34b3 is configured to apply OBMC to the prediction target block based on the determination result of the OBMC application determination unit 34b2, in other words, if it is determined to apply OBMC.

Herein, OBMC is an overlapped block motion compensation process of correcting the prediction image signal of the prediction target block by subjecting the prediction image signal of the prediction target block and the prediction image signal, which is generated based on the information about the motion vector of the adjacent block of the prediction target block and the reference frame, to weighted averaging.

Hereinafter, with reference to FIG. 8 to FIG. 23, specific determination methods about whether OBMC is to be applied or not and application methods of OBMC will be described. Following examples describe about the MC prediction unit 34b in the image decoding device 30. However, the MC prediction unit 11c in the image encoding device 10 is also assumed to have similar functions.

Also, the determination methods and application methods described above are applied in a case in which the motion vector of the prediction target block and the motion vector of the adjacent block are different from each other. In a case in which the motion vectors of both of them are equal to each other or a difference therebetween is considered to be small, application of OBMC to the boundary between the prediction target block and the adjacent block is meaningless. Therefore, hereinafter, the present specification will be described on the assumption that the motion vector of the prediction target block and the motion vector of the adjacent block are different from each other.

Note that, for the sake of simplicity of the document, cases in which the determination methods and the application methods described above are carried out in the prediction target block unit are used as case examples. However, the determination methods and application methods described above may be carried out in the sub block unit, which are obtained by dividing the prediction target block.

Figure 8:
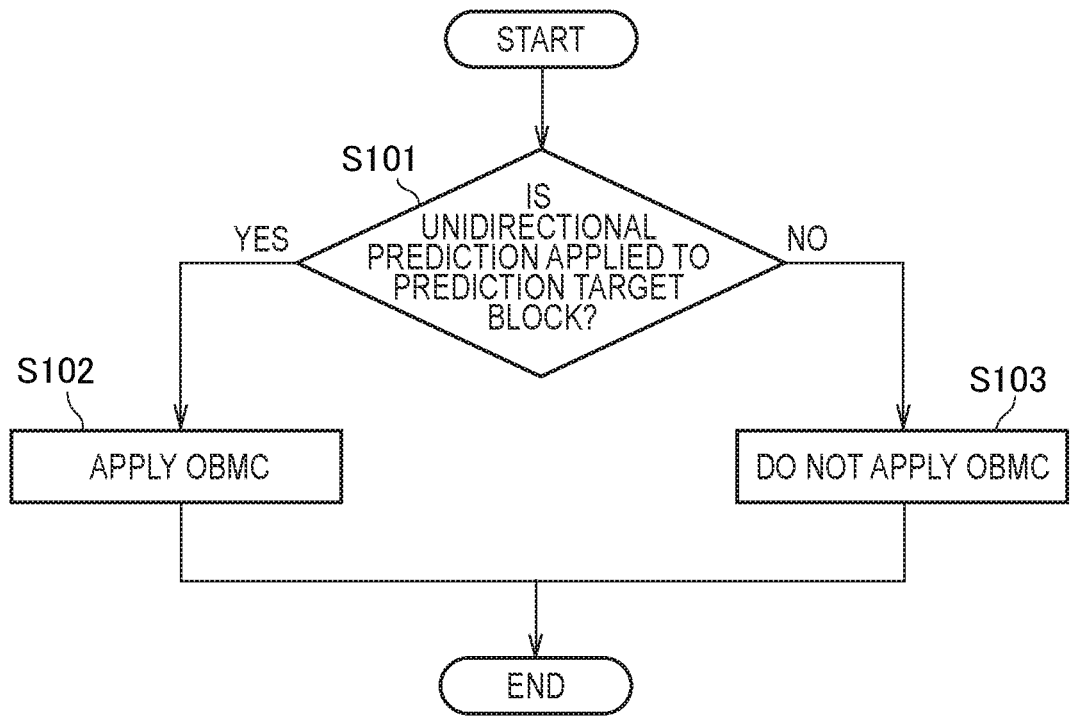
FIG. 8 is a flow chart illustrating an example of working of the MC prediction unit 34b of the inter prediction unit 34 of the image decoding device 30 according to an embodiment.

Hereinafter, a first embodiment of the present invention will be described with reference to FIG. 8. FIG. 8 is a flow chart illustrating an example of working of the MC prediction unit 34b of the inter prediction unit 34 of the present embodiment.

In the present embodiment, the OBMC application determination unit 34b2 of the MC prediction unit 34b is configured to determine whether to apply OBMC to the prediction target block or not based on a type of a prediction direction (unidirectional prediction or bidirectional prediction) of the prediction target block.

As illustrated in FIG. 8, in step S101, the OBMC application determination unit 34b2 determines whether the unidirectional prediction is applied to the prediction target block or not.

If it is determined that the unidirectional prediction is applied to the prediction target block, the present procedure proceeds to step S102. If it is determined that the unidirectional prediction is not applied to the prediction target block, the present procedure proceeds to step S103.

In step S102, the OBMC application determination unit 34b2 determines to apply OBMC to the prediction target block, and the OBMC application unit 34b3 applies OBMC to the prediction target block.

In step S103, the OBMC application determination unit 34b2 determines not to apply OBMC to the prediction target block and outputs the prediction image signal, which has been generated by the standard MC prediction unit 34b1, without change.

Note that, if OBMC is to be applied to the prediction target block in a case in which the bidirectional prediction is applied to the prediction target block, the memory bandwidth that requires additional fetch and the number of times of calculations are increased compared with the case in which OBMC is applied to the prediction target block if the unidirectional prediction is applied to the prediction target block. Therefore, according to the image encoding device 10 and the image decoding device 30 according to the present embodiment, the unintentional increase in the memory bandwidth and the number of times of calculations can be prevented by applying OBMC to the prediction target block only if the unidirectional prediction is applied to the prediction target block.

Figure 9:
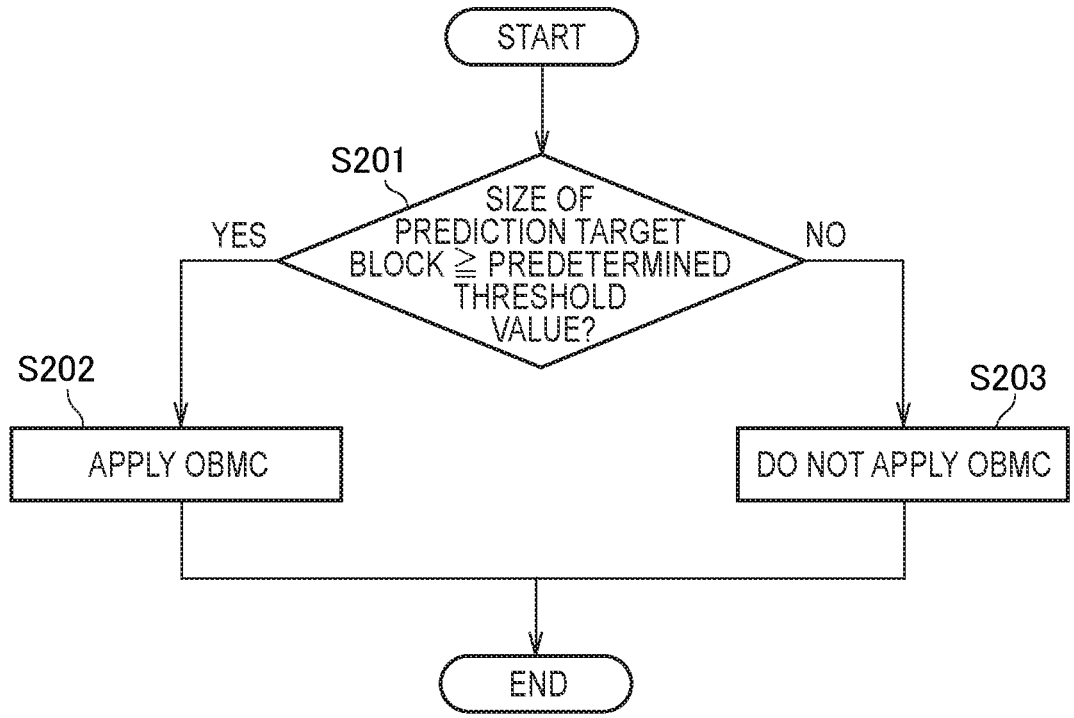
FIG. 9 is a flow chart illustrating an example of working of the MC prediction unit 34b of the inter prediction unit 34 of the image decoding device 30 according to an embodiment.

Hereinafter, a second embodiment of the present invention will be described with reference to FIG. 9. FIG. 9 is a flow chart illustrating an example of working of the MC prediction unit 34*b* of the inter prediction unit 34 of the present embodiment.

In the present embodiment, the OBMC application determination unit 34*b*2 of the MC prediction unit 34*b* is configured to determine to apply OBMC to the prediction target block if the size of the prediction target block is equal to or higher than a predetermined threshold value.

As illustrated in FIG. 9, in step S201, the OBMC application determination unit 34*b*2 determines whether the size of the prediction target block is equal to or higher than the predetermined threshold value or not.

If it is determined that the size of the prediction target block is equal to or higher than the predetermined threshold value, the present procedure proceeds to step S202. If it is determined that the size of the prediction target block is less than the predetermined threshold value, the present procedure proceeds to step S203.

In step S202, the OBMC application determination unit 34*b*2 determines to apply OBMC to the prediction target block, and the OBMC application unit 34*b*3 applies OBMC to the prediction target block.

In step S203, the OBMC application determination unit 34*b*2 determines not to apply OBMC to the prediction target block and outputs the prediction image signal, which has been generated by the standard MC prediction unit 34*b*1, without change.

Herein, the predetermined threshold value may be set to, for example, the value with which the memory bandwidth and the number of times of calculations required in application of OBMC are lower compared with the memory bandwidth and the number of times of calculations in the bidirectional prediction of the case in which OBMC is not applied.

Also, in the above described example, the OBMC application determination unit 34*b*2 determines the size of the prediction target block by using the number of pixels of the prediction target block. However, as another method, the OBMC application determination unit 34*b*2 may be configured to determine the size of the prediction target block by using a height and a width of the prediction target block.

Also, the OBMC application determination unit 34*b*2 may be configured to carry out determination of application of OBMC to the prediction target block by using a table instead of the predetermined threshold value.

Note that, if OBMC is applied to the prediction target block which has a comparatively small size, the memory bandwidth that requires additional fetch and the number of times of calculations increase. Therefore, according to the image encoding device 10 and the image decoding device 30 according to the present embodiment, the unintentional increase in the memory bandwidth and the number of times of calculations can be prevented by controlling whether OBMC is to be applied to the prediction target block or not based on the size of the prediction target block.

Figure 10:
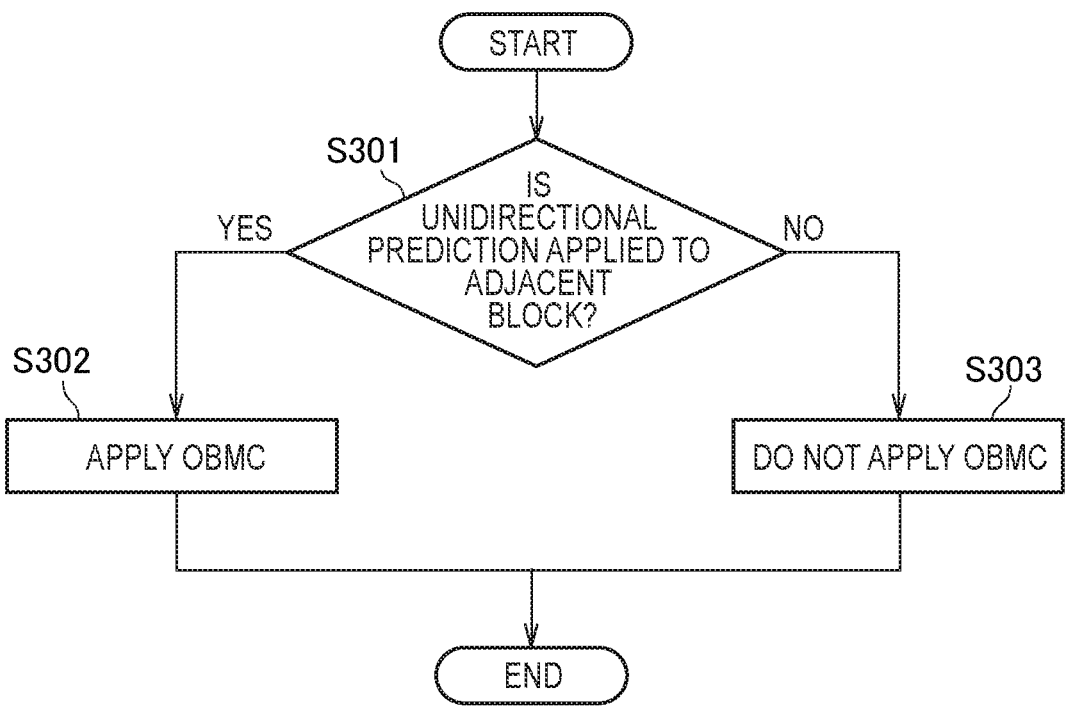
FIG. 10 is a flow chart illustrating an example of working of the MC prediction unit 34b of the inter prediction unit 34 of the image decoding device 30 according to an embodiment.

Hereinafter, the first embodiment of the present invention will be described with reference to FIG. 10. FIG. 10 is a flow chart illustrating an example of working of the MC prediction unit 34*b* of the inter prediction unit 34 of the present embodiment.

In the present embodiment, the OBMC application determination unit 34*b*2 of the MC prediction unit 34*b* is configured to determine whether to apply OBMC to the prediction target block or not based on the type of a prediction direction (unidirectional prediction or bidirectional prediction) of the adjacent block of the prediction target block.

As illustrated in FIG. 10, in step S301, the OBMC application determination unit 34*b*2 determines whether the unidirectional prediction is applied to the adjacent block or not.

If it is determined that the unidirectional prediction is applied to the adjacent block, the present procedure proceeds to step S302. If it is determined that the unidirectional prediction is not applied to the adjacent block, the present procedure proceeds to step S303.

In step S302, the OBMC application determination unit 34*b*2 determines to apply OBMC to the prediction target block, and the OBMC application unit 34*b*3 applies OBMC to the prediction target block.

In step S303, the OBMC application determination unit 34*b*2 determines not to apply OBMC to the prediction target block and outputs the prediction image signal, which has been generated by the standard MC prediction unit 34*b*1, without change.

Note that, if OBMC is to be applied to the prediction target block in a case in which the bidirectional prediction is applied to the adjacent block, the memory bandwidth that requires additional fetch and the number of times of calculations are increased compared with the case in which OBMC is applied to the prediction target block if the unidirectional prediction is applied to the adjacent block. Therefore, according to the image encoding device 10 and the image decoding device 30 according to the present embodiment, the unintentional increase in the memory bandwidth and the number of times of calculations can be prevented by applying OBMC to the prediction target block only if the unidirectional prediction is applied to the adjacent block.

Figure 11:
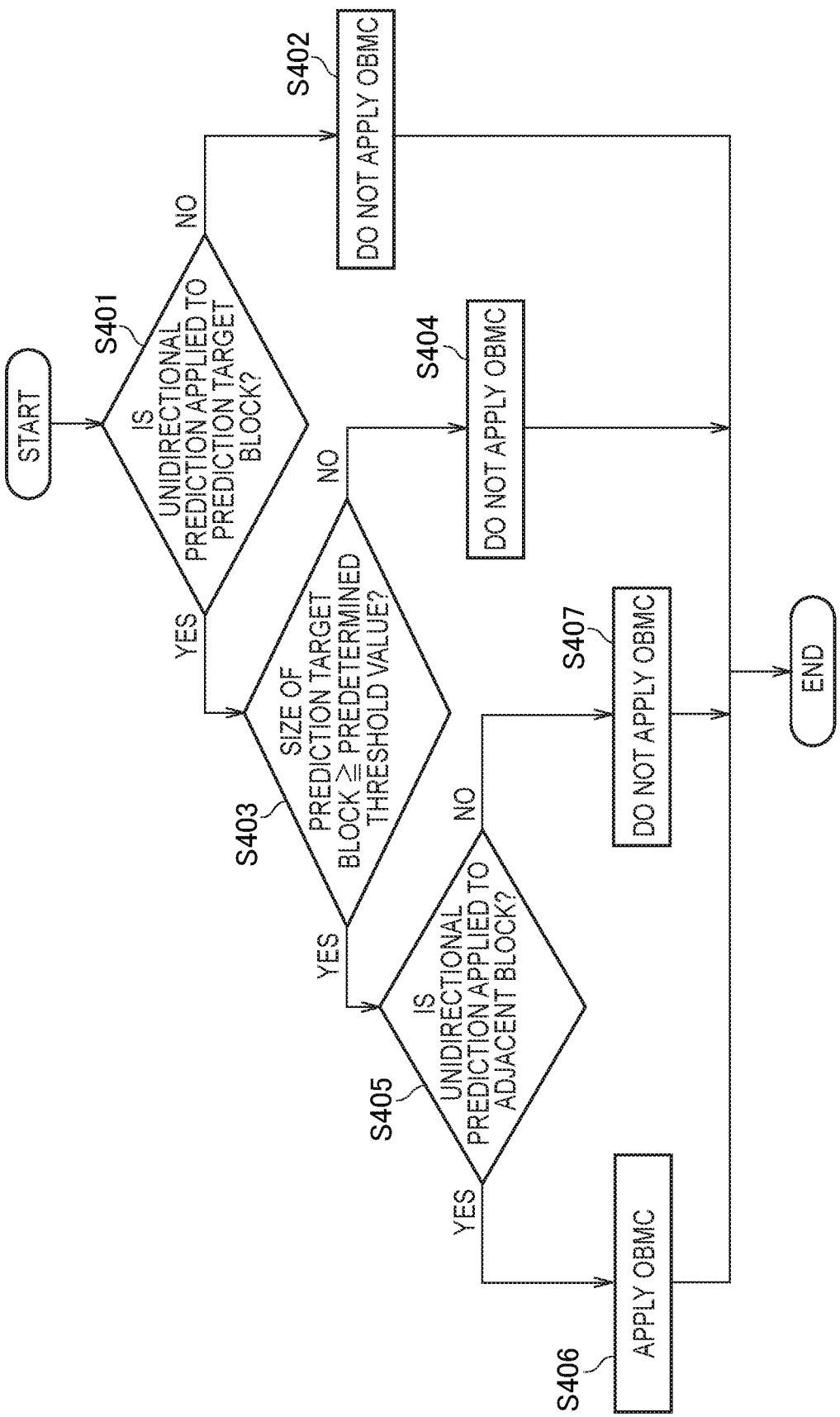
FIG. 11 is a flow chart illustrating an example of working of the MC prediction unit 34b of the inter prediction unit 34 of the image decoding device 30 according to a modification example.

Hereinafter, with reference to FIG. 11, Modification Example 1 of the present invention will be described by focusing on differences from the above described first to third embodiments. FIG. 11 is a flow chart illustrating an example of working of the MC prediction unit 34*b* of the inter prediction unit 34 of present Modification Example 1.

As illustrated in FIG. 11, in step S401, the MC prediction unit 34*b* determines whether the unidirectional prediction is applied to the prediction target block or not.

If it is determined that the unidirectional prediction is applied to the prediction target block, the present procedure proceeds to step S403. If it is determined that the unidirectional prediction is not applied to the prediction target block, the present procedure proceeds to step S402.

In step S402, the OBMC application determination unit 34*b*2 determines not to apply OBMC to the prediction target block and outputs the prediction image signal, which has been generated by the standard MC prediction unit 34*b*1, without change.

In step S403, the OBMC application determination unit 34*b*2 determines whether the size of the prediction target block is equal to or higher than the predetermined threshold value or not.

If it is determined that the size of the prediction target block is equal to or higher than the predetermined threshold value, the present procedure proceeds to step S405. If it is determined that the size of the prediction target block is less than the predetermined threshold value, the present procedure proceeds to step S404.

In step S404, the OBMC application determination unit 34*b*2 determines not to apply OBMC to the prediction target block and outputs the prediction image signal, which has been generated by the standard MC prediction unit 34b1, without change.

In step S405, the MC prediction unit 34b determines whether the unidirectional prediction is applied to the adjacent block or not.

If it is determined that the unidirectional prediction is applied to the adjacent block, the present procedure proceeds to step S406. If it is determined that the unidirectional prediction is not applied to the adjacent block, the present procedure proceeds to step S407.

In step S406, the OBMC application determination unit 34b2 determines to apply OBMC to the prediction target block, and the OBMC application unit 34b3 applies OBMC to the prediction target block.

In step S407, the OBMC application determination unit 34b2 determines not to apply OBMC to the prediction target block and outputs the prediction image signal, which has been generated by the standard MC prediction unit 34b1, without change.

As described above, in present Modification Example 1, in application of OBMC to the prediction target block, the OBMC application determination unit 34b2 firstly determines whether the unidirectional prediction is applied to the prediction target block or not, secondly determines whether the size of the prediction target block is equal to or higher than the predetermined threshold value or not, and thirdly determines whether the unidirectional prediction is applied to the adjacent block or not.

In present Modification example 1, effects exerted by carrying out the determination whether the size of the prediction target block is equal to or higher than the predetermined threshold value or not after determining whether the unidirectional prediction is applied to the prediction target block or not are described below.

According to the above described first embodiment, if the unidirectional prediction is applied to the prediction target block, OBMC is uniformly applied. However, the effects can be exerted since a worst case of OBMC application can be avoided by introducing a restriction based on the size of the prediction target block after determining whether the unidirectional prediction is applied to the prediction target block or not.

This worst case can occur when all coding tree blocks are filled with minimum encoding target blocks or prediction target blocks, and the memory bandwidth and the number of times of calculation required for OBMC application are maximum in this case. In other words, it can be said that this worst case provides the memory bandwidth and the number of times of calculation required for OBMC application.

Therefore, as a result of introducing the size of the prediction target block to the determination of applicability of OBMC, for example, the memory bandwidth and the number of times of calculations required in the case in which the unidirectional prediction is applied to the prediction target block and OBMC is applied can be reduced compared with the memory bandwidth and the number of times of calculations required for standard MC in the case in which OBMC is not applied and the bidirectional prediction is applied to the prediction target block.

Also, in present Modification Example 1, the effects exerted by carrying out the determination whether the unidirectional prediction is applied to the adjacent block or not after determining whether the size of the prediction target block is equal to or higher than the predetermined threshold value or not are described below.

According to the above described configuration, if the unidirectional prediction is applied to the prediction target block and the size of the prediction target block is equal to or higher than the predetermined threshold value, OBMC is uniformly applied. However, even in such a case, if the bidirectional prediction is applied to the adjacent block, the memory bandwidth and the number of times of calculations required may exceed those of the worst case.

On the other hand, if the bidirectional prediction is applied to the adjacent block, the memory bandwidth and the number of times of calculations required in OBMC application can be reduced by not applying OBMC compared with the memory bandwidth and the number of times of calculations required for standard MC in the case in which OBMC is not applied and the bidirectional prediction is applied to the prediction target block.

Herein, for example, specific examples of conditional branching of a case in which the prediction target block and OBMC-related parameters have following values are shown.
  Coding tree block: 128×128
  Minimum size of prediction target block: 4×4
  The number of standard motion compensation taps with respect to brightness: 8
  The number of standard motion compensation taps with respect to color difference: 4
  The number of taps of OBMC with respect to brightness: 8
  The number of taps of OBMC with respect to color difference: 4
  The number of OBMC lines: 4 lines
  Bidirectional prediction prohibited size of prediction target block: 4×4

Herein, according to the conditional branching of FIG. 11, the determination conditions about whether OBMC is to be applied or not can be set as following. Note that the following predetermined threshold values are set so that the memory bandwidth required for standard MC in the case in which OBMC is not applied and the bidirectional prediction is applied to the prediction target block is not exceeded. Herein, S and L represent a short side and a long side (SL) obtained by comparing the height and width of the prediction target block.

In the case in which the unidirectional prediction is applied to the prediction target block,
  (S=4 and L<64) or (S=8 and L=8)→do not apply OBMC.
  (S=4 and L≥64) or (S=8 and L≥16) or (S≥16)→apply OBMC if the unidirectional prediction is applied to the adjacent block. —If the bidirectional prediction is applied to the prediction target block, do not apply OBMC.

On the other hand, the OBMC application determination unit 34b2 may be configured to determine applicability of OBMC, for example, based on a table as illustrated in FIG. 12 instead of the predetermined threshold value.

In FIG. 12, "SHORT SIDE" and "LONG SIDE" represent a short side and a long side obtained by comparing the height and the width of the prediction target block, "NOT APPLICABLE" in FIG. 12 represent that OBMC is not applied, and "UNIDIRECTIONAL" in FIG. 12 represents that OBMC is applied if the unidirectional prediction is applied to the adjacent block. Also, in FIG. 12, "BIDIRECTIONAL", which is not illustrated, means to apply OBMC if the unidirectional prediction or the bidirectional prediction is applied to the adjacent block.

In the above described example, the predetermined threshold value, which uses the value with which the memory bandwidth is not exceeded as an indication, or the table (FIG. 12) has been described. However, if the number of times of calculations is used as an indication, the setting method of the predetermined threshold value does not have symmetrical threshold values in the size (height and width) of the prediction target block as described with the memory bandwidth.

This is for a reason that the number of times of calculations changes depending on the processing order of MC. Therefore, a table using the number of times of calculations as an indication can have asymmetric values in size, for example, as illustrated in FIG. 13.

In actual setting of the predetermined threshold value and designing of the table, compared with the parameters described above, the memory bandwidth and the number of times of calculations are set to be lower than in the case in which OBMC is not applied and the bidirectional prediction is applied to the prediction target block, and stricter conditions are set among the respective conditions which are obtained for the memory bandwidth and the number of times of calculations.

Figure 14:
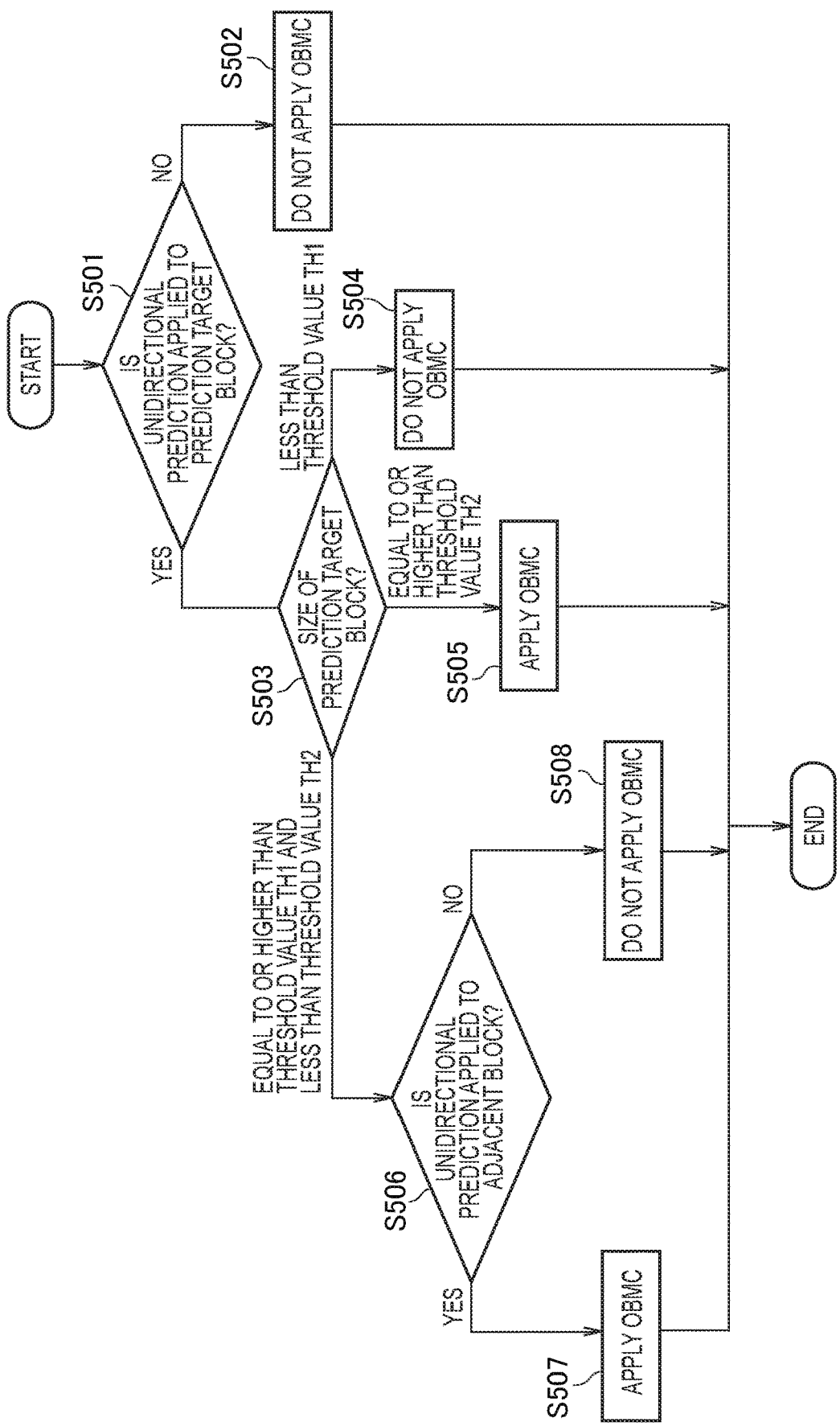
FIG. 14 is a flow chart illustrating an example of working of the MC prediction unit 34b of the inter prediction unit 34 of the image decoding device 30 according to an embodiment.

Hereinafter, with reference to FIG. 14 and FIG. 15, a fourth embodiment of the present invention will be described. FIG. 14 is a flow chart illustrating an example of working of the MC prediction unit 34b of the inter prediction unit 34 of the present embodiment.

In above described Modification Example 1, if the size of the prediction target block is equal to or higher than the predetermined threshold value, OBMC is applicable. However, the case to which OBMC is actually applied is limited to the case in which the unidirectional prediction is applied to the adjacent block.

However, depending on the size of the prediction target block, even if the bidirectional prediction is applied to the adjacent block, there is a case in which the memory bandwidth and the number of times of calculations required for application of OBMC can be reduced than the memory bandwidth and the number of times of calculations required for standard MC of a case in which OBMC is not applied and the bidirectional prediction is applied to the prediction target block. In that case, encoding performance improves when OBMC is applied even in the case in which the bidirectional prediction is applied to the adjacent block.

As illustrated in FIG. 14, in step S501, the OBMC application determination unit 34b2 determines whether the unidirectional prediction is applied to the prediction target block or not.

If it is determined that the unidirectional prediction is applied to the prediction target block, the present procedure proceeds to step S503. If it is determined that the unidirectional prediction is not applied to the prediction target block, the present procedure proceeds to step S502.

In step S502, the OBMC application determination unit 34b2 determines not to apply OBMC to the prediction target block and outputs the prediction image signal, which has been generated by the standard MC prediction unit 34b1, without change.

In step S503, the OBMC application determination unit 34b2 determines the size of the prediction target block.

If it is determined that the size of the prediction target block is less than the threshold value TH1, the present procedure proceeds to step S504. If it is determined that the size of the prediction target block is equal to or higher than the threshold value TH1 and less than a threshold value TH2, the present procedure proceeds to step S506. If it is determined that the size of the prediction target block is equal to or higher than the threshold value TH, the present procedure proceeds to step S505.

In step S504, the OBMC application determination unit 34b2 determines not to apply OBMC to the prediction target block and outputs the prediction image signal, which has been generated by the standard MC prediction unit 34b1, without change.

In step S505, the OBMC application determination unit 34b2 determines to apply OBMC to the prediction target block, and the OBMC application unit 34b3 applies OBMC to the prediction target block.

In step S506, the OBMC application determination unit 34b2 determines whether the unidirectional prediction is applied to the adjacent block or not.

If it is determined that the unidirectional prediction is applied to the adjacent block, the present procedure proceeds to step S507. If it is determined that the unidirectional prediction is not applied to the adjacent block, the present procedure proceeds to step S508.

In step S507, the OBMC application determination unit 34b2 determines to apply OBMC to the prediction target block, and the OBMC application unit 34b3 applies OBMC to the prediction target block.

In step S508, the OBMC application determination unit 34b2 determines not to apply OBMC to the prediction target block and outputs the prediction image signal, which has been generated by the standard MC prediction unit 34b1, without change.

In the present embodiment, the OBMC application determination unit 34b2 is configured to use the two threshold values (wherein, the threshold value TH1 the threshold value TH2).

Then, the OBMC application determination unit 34b2 determines not to apply OBMC to the prediction target block if the size of the prediction target block is less than the threshold value TH1, makes a transition to the determination about whether the unidirectional prediction is applied to the adjacent block or not if the size of the prediction target block is equal to or higher than the threshold value TH1 and less than the threshold value TH2, and determines to apply OBMC to the prediction target block regardless of whether the bidirectional prediction is applied to the adjacent block or not if the size of the prediction target block is equal to or higher than the threshold value TH2.

In other words, the OBMC application determination unit 34b2 is configured to control the type of the prediction direction (the unidirectional prediction or the bidirectional prediction) applied to the adjacent block based on the size of the prediction target block to determine whether OBMC is to be applied to the prediction target block or not.

Herein, for example, specific examples (setting method of the threshold values) of conditional branching of a case in which the prediction target block and OBMC-related parameters have following values are shown.

Coding tree block: 128×128
  Minimum size of prediction target block: 4×4
  The number of standard motion compensation taps with respect to brightness signal: 8
  The number of standard motion compensation taps with respect to color difference signal: 4
  The number of taps of OBMC with respect to brightness signal: 8
  The number of taps of OBMC with respect to color difference signal: 4
  The number of OBMC lines: 4 lines
  Bidirectional prediction prohibited size of prediction target block: 4×4

Note that the above description shows a case example in which the image signal, i.e., each of a brightness signal (Y)

and a color difference signal (CbCr) consists of 4:2:0. If this has another configuration (4:4:4 or 4:2:2), the number of taps of OBMC may be appropriately changed.

Herein, the determination conditions about whether OBMC is to be applied or not can be set as following. Note that the following threshold values are set so that the memory bandwidth required for standard MC in the case in which OBMC is not applied and the bidirectional prediction is applied to the prediction target block is not exceeded. Herein, S and L represent a short side and a long side (S≤L) obtained by comparing the height and width of the prediction target block.

In the case in which the unidirectional prediction is applied to the prediction target block, (S=4 and L<64) or (S=8 and L=8)→do not apply OBMC.

(S=4 and L≥64) or (S=8 and L≥16) or (S≥16)→apply OBMC if the unidirectional prediction is applied to the adjacent block.

(S≥16)→apply OBMC even if the bidirectional prediction is applied to the adjacent block. —If the bidirectional prediction is applied to the prediction target block, do not apply OBMC.

Figure 15:
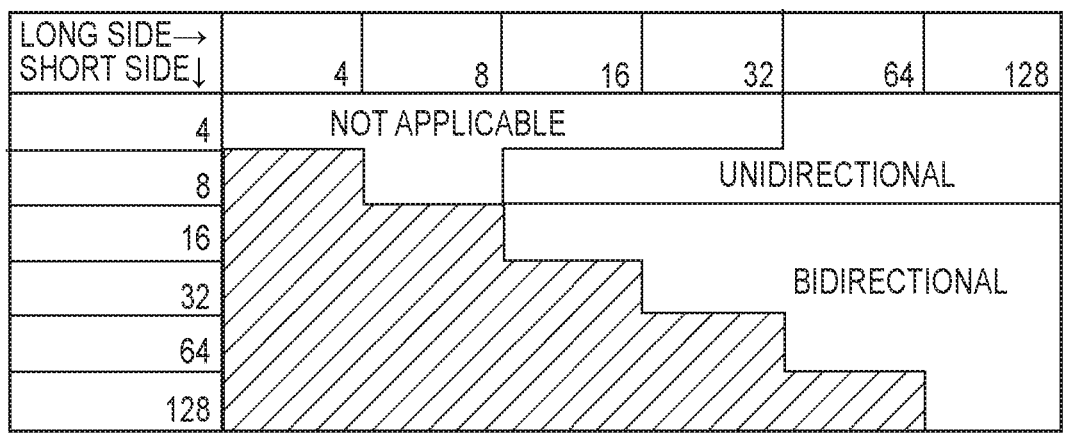
FIG. 15 is a diagram illustrating an example of the table used in an embodiment.

On the other hand, the OBMC application determination unit 34b2 may be configured to determine applicability of OBMC, for example, based on a table as illustrated in FIG. 15 instead of the predetermined threshold value. Note that a gray out part in FIG. 15 does not have to be taken into consideration since this is a part in which SL regarding the short side S and the long side L described above.

Hereinafter, a fifth embodiment of the present invention will be described with reference to FIG. 16.

In the above described fourth embodiment, a case in which the number of taps of OBMC (the number of overlapped block motion compensation taps) is "8" has been described. However, in a case in which the number of taps of OBMC is changed from "8" to "4" and a case in which the number of taps of OBMC is changed from "8" to "2", the memory bandwidth and the number of times of calculations required in OBMC application are reduced, and restrictions on OBMC application are therefore eased.

For example, in the above described embodiment, in a case in which only the number of taps of filters is changed, determination conditions about whether OBMC is to be applied or not are set as following. However, as well as the above described case, the following threshold values are set so that the memory bandwidth required for standard MC in the case in which OBMC is not applied and the bidirectional prediction is applied to the prediction target block is not exceeded.

In a case in which the unidirectional prediction is applied to the prediction target block, (S=4 and L=4)→apply 2-tap OBMC (however, if the unidirectional prediction is applied to the adjacent block).

(S=4 and L>4 and L<64) or (S=8 and L=8)→apply 4-tap OBMC (however, if the unidirectional prediction is applied to the adjacent block).

(S=4 and H≤64) or (S=8 and L≥16) or (S≥16)→apply 8-tap OBMC (however, if the unidirectional prediction is applied to the adjacent block).

If the bidirectional prediction is applied to the prediction target block, do not apply OBMC.

Figure 16:
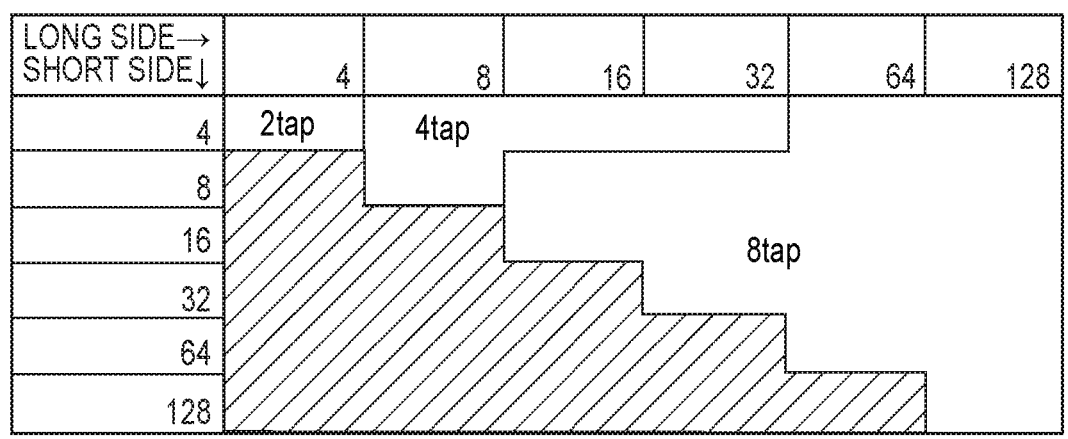
FIG. 16 is a diagram illustrating an example of the table used in an embodiment.

On the other hand, the OBMC application determination unit 34b2 may be configured to determine applicability of OBMC, for example, based on a table as illustrated in FIG. 16 instead of the predetermined threshold value.

Herein, the number of taps branched by the above described conditions has downward compatibility. For example, under the conditions in which 8-tap OBMC can be used, 4-tap or 2-tap OBMC may be used instead of 8 taps.

Furthermore, as described above, the application restrictions of OBMC with respect to the prediction target block having a small size may be eased by controlling the number of OBMC taps of the adjacent block based on the size of the prediction target block. For example, in the above described example, when the number of taps is changed from 8 taps to 2 taps with respect to the prediction target block (4×4) having a small size to which OBMC is not applicable in FIG. 15, OBMC can be also applied to the prediction target block of this size.

In FIG. 16, "2 tap" means application of 2-tap OBMC (however, if the unidirectional prediction is applied to the adjacent block), "4 tap" means application of 4-tap OBMC (however, if the unidirectional prediction is applied to the adjacent block), and "8 tap" means application of 8-tap OBMC (however, if the unidirectional prediction is applied to the adjacent block). However, the number of taps in FIG. 16 has downward compatibility. For example, in the case of "4 tap", 2-tap OBMC may be applied, and, in the case of "8 tap", 2-tap or 4-tap OBMC may be applied.

Herein, regarding the 4 taps, for example, a standard MC filter (4 taps) for color difference signals may be diverted. Also, regarding the 2 taps, for example, a bi-linear filter may be used. Note that, when the standard MC for color difference signals is diverted for the 4 taps, an effect that additional filter designing becomes unnecessary upon hardware implementation is provided.

As described above, in the present embodiment, the OBMC application determination unit 34b2 is configured to control the number of taps of OBMC based on the size of the prediction target block to determine whether to apply OBMC to the prediction target block or not.

Hereinabove, the methods of controlling the type of the prediction direction of the adjacent block depending on the size of the prediction target block or controlling the number of taps of OBMC have been described. In order to cause the memory bandwidth and the number of times of calculations required in OBMC application to be lower than the memory bandwidth and the number of times of calculations required in standard MC of the case in which OBMC is not applied and the bidirectional prediction is applied to the prediction target block and in order to maximize improvement of encoding performance, a method of maximally easing the conditions of OBMC applicability by combining both of the type of the prediction direction of the adjacent block depending on the size of the prediction target block and the number of taps of OBMC is conceivable.

In such a case, threshold values and a table are designed by the same idea as the above description. For example, about the threshold value, In a case in which the unidirectional prediction is applied to the prediction target block, (S=4 and L=4)→apply 2-tap OBMC (however, if the unidirectional prediction is applied to the adjacent block).

(S=4 and L=8)→apply 2-tap OBMC (however, a case in which the bidirectional prediction is applied to the adjacent block is also permissible).

(S=4 and L>16) or (S=8 and L≥8)→apply 4-tap OBMC (however, a case in which the bidirectional prediction is applied to the adjacent block is also permissible).

(S≥16)→apply 8-tap OBMC (however, a case in which the bidirectional prediction is applied to the adjacent block is also permissible).

If the bidirectional prediction is applied to the prediction target block, do not apply OBMC.

Herein, the number of OBMC taps branched by the above described conditions has downward compatibility. For example, under the conditions in which 8-tap OBMC can be used, 4-tap or 2-tap OBMC may be used instead of 8 taps.

Also, regarding the prediction direction of the adjacent block branched by the above described conditions, the unidirectional prediction may be used under the conditions in which application of the bidirectional prediction is permitted.

Furthermore, as described above, the application restrictions of OBMC with respect to the prediction target block having a small size may be eased by controlling the number of OBMC taps of the adjacent block or the type of the prediction direction based on the size of the prediction target block.

For example, in the above described example, when the number of taps is changed from 8 taps to 2 taps with respect to the prediction target block (4×4) having a small size to which OBMC is not applicable in FIG. 15, OBMC can be also applied to the prediction target block of this size. Also, with respect to the 4×8 or 8×4 prediction target block, when the number of taps is changed from 8 taps to 2 taps, the memory bandwidth and the number of times of calculations for the standard MC of the prediction target block to which OBMC is not applied and the bidirectional prediction is used are not exceeded even when OBMC is applied also to the adjacent block which uses the bidirectional prediction; therefore, OBMC of 2-tap adjacent bidirectional prediction can be carried out.

As described above, the combination of the number of taps of the filter and the type of the prediction direction may be freely set by the intention of a designer as long as the combination condition causes the memory bandwidth and the number of times of calculations required in OBMC application to be lower than the memory bandwidth and the number of times of calculations required for the standard MC of the case in which OBMC is not applied and the prediction target block uses the bidirectional prediction.

Figure 17:
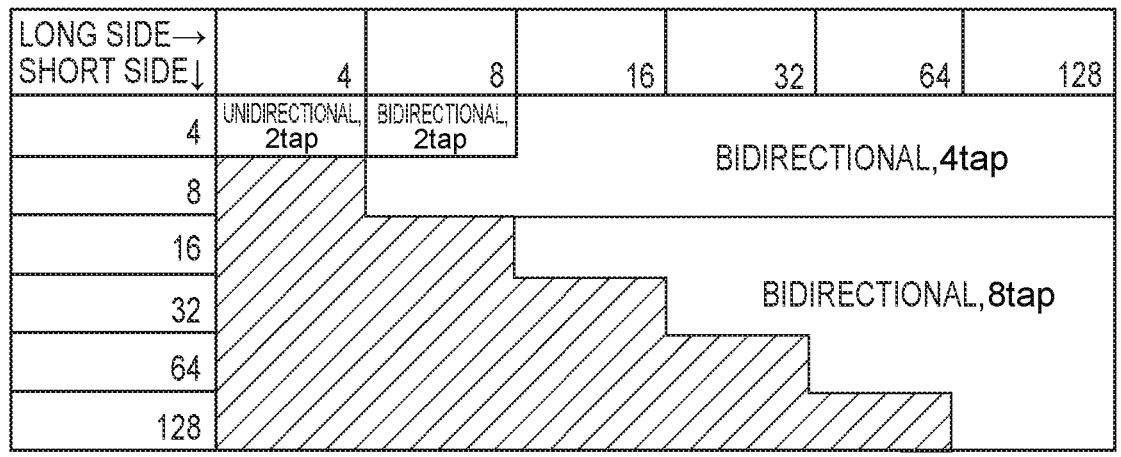
FIG. 17 is a diagram illustrating an example of the table used in a modification example.

On the other hand, the OBMC application determination unit 34*b*2 may be configured to determine applicability of OBMC, for example, based on a table as illustrated in FIG. 17 instead of the predetermined threshold value.

Note that, according to the table of FIG. 17, the OBMC application determination unit 34*b*2 is configured so that the number of taps of OBMC ("2") of the adjacent block applied to the prediction target block of a first size (for example, 4×4) is smaller than the number of taps of OBMC ("8") of the adjacent block applied to the prediction target block of a second size (for example, 128×128), which is larger than the first size.

Alternatively, according to the table of FIG. 17, the OBMC application determination unit 34*b*2 is configured so that the type of the prediction direction (unidirectional) of the adjacent block applied to the prediction target block of the first size (for example, 4×4) is smaller than the type of the prediction direction (bidirectional) of the adjacent block applied to the prediction target block of the second size (for example, 4×8 or 8×4), which is larger than the first size.

Herein, a plurality of threshold values for branching the OBMC filter tap number or the type of the prediction direction with respect to the above described adjacent block may be used as illustrated in FIG. 17.

Hereinabove, the methods of controlling the type of the prediction direction of the adjacent block or the number of taps of OBMC depending on the size of the prediction target block have been described. However, similar means of reducing the memory bandwidth and the number of times of calculations in OBMC application include changing of accuracy of the motion vector of the adjacent block or changing of the number of application lines of OBMC in OBMC application depending on the size of the prediction target block.

About the changing of the accuracy of the motion vector, for example, the accuracy of the motion vector may be configured to be changed from a decimal to an integer if the size of the prediction target block is smaller than the predetermined threshold value, and the accuracy of the motion vector may be configured to be a decimal if the size of the prediction target block is larger than the predetermined threshold value.

Also, the number of application lines of OBMC may be configured to be reduced if the size of the prediction target block is smaller than the predetermined threshold value, and, on the other hand, the number of application lines of OBMC may be configured to be increased if the size of the prediction target block is larger than the predetermined threshold value.

Description of the setting method of the threshold value and the table in this case will be omitted since they are similar to those of the cases of the above described embodiments and modification examples.

Figure 18:
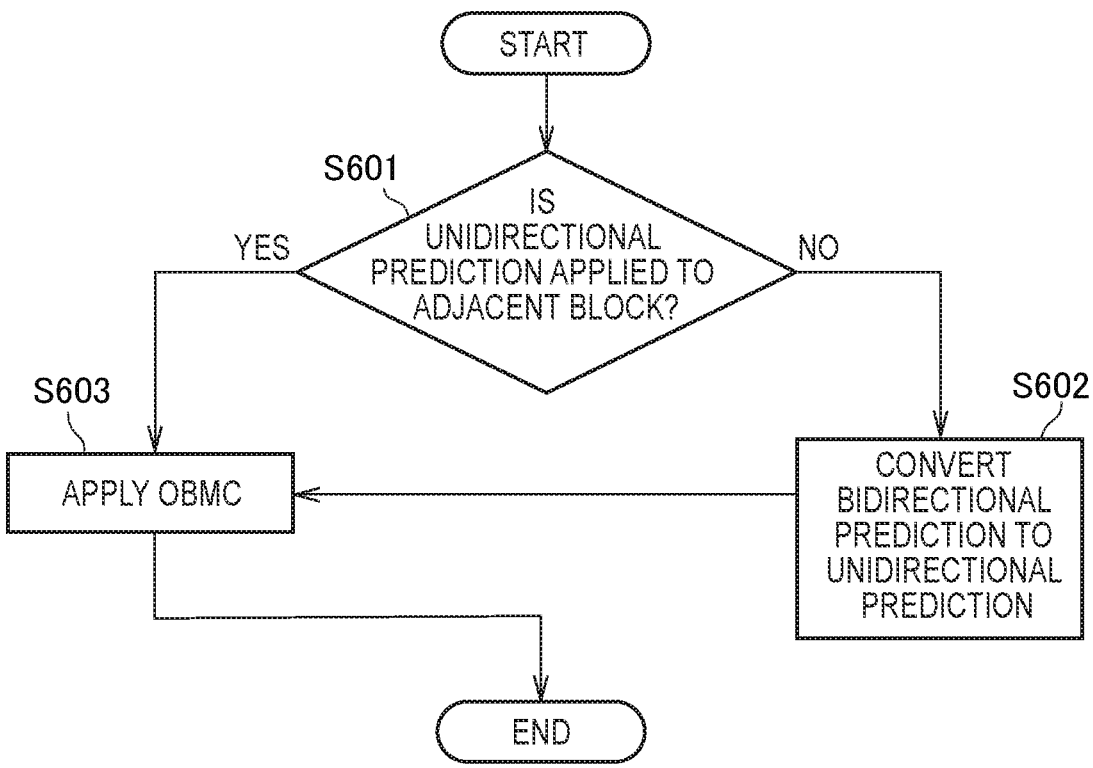
FIG. 18 is a flow chart illustrating an example of working of the MC prediction unit 34b of the inter prediction unit 34 of the image decoding device 30 according to an embodiment.

Hereinafter, with reference to FIG. 18 and FIG. 19, Modification Example 4 of the present invention will be described by focusing on differences from the above described embodiments or modification examples. FIG. 18 is a flow chart illustrating an example of working of the MC prediction unit 34*b* of the inter prediction unit 34 of present Modification Example 4.

As illustrated in FIG. 18, in step S601, the OBMC application determination unit 34*b*2 determines whether the unidirectional prediction is applied to the adjacent block or not.

If it is determined that the unidirectional prediction is applied to the adjacent block, the present procedure proceeds to step S603. If it is determined that the unidirectional prediction is not applied to the adjacent block, the present procedure proceeds to step S602.

In step S602, the OBMC application determination unit 34*b*2 converts the prediction method applied to the adjacent block from the bidirectional prediction to the unidirectional prediction by a predetermined method.

In step S603, the OBMC application determination unit 34*b*2 determines to apply OBMC to the prediction target block, and the OBMC application unit 34*b*3 applies OBMC to the prediction target block.

According to present Modification Example 4, in the case in which the bidirectional prediction is applied to the adjacent block, OBMC is configured to be applied by converting the prediction method applied to the adjacent block from the bidirectional prediction to the unidirectional prediction by the predetermined method. Note that the predetermined method will be described later.

According to this Modification Example 4, by converting the prediction method applied to the adjacent block from the bidirectional prediction to the unidirectional prediction, the number of the prediction target blocks to which OBMC is applied can be increased, and the memory bandwidth and the number of times of calculations required for OBMC can be reduced.

As described above, the OBMC application determination unit 34*b*2 is configured to convert the prediction method applied to the adjacent block from the bidirectional prediction to the unidirectional prediction by the predetermined method in the case in which the bidirectional prediction is applied to the adjacent block.

Hereinafter, with reference to FIG. 19 and FIG. 20, the predetermined method used to convert the prediction method applied to the adjacent block from the bidirectional prediction to the unidirectional prediction will be described.

Figures 19, 20:
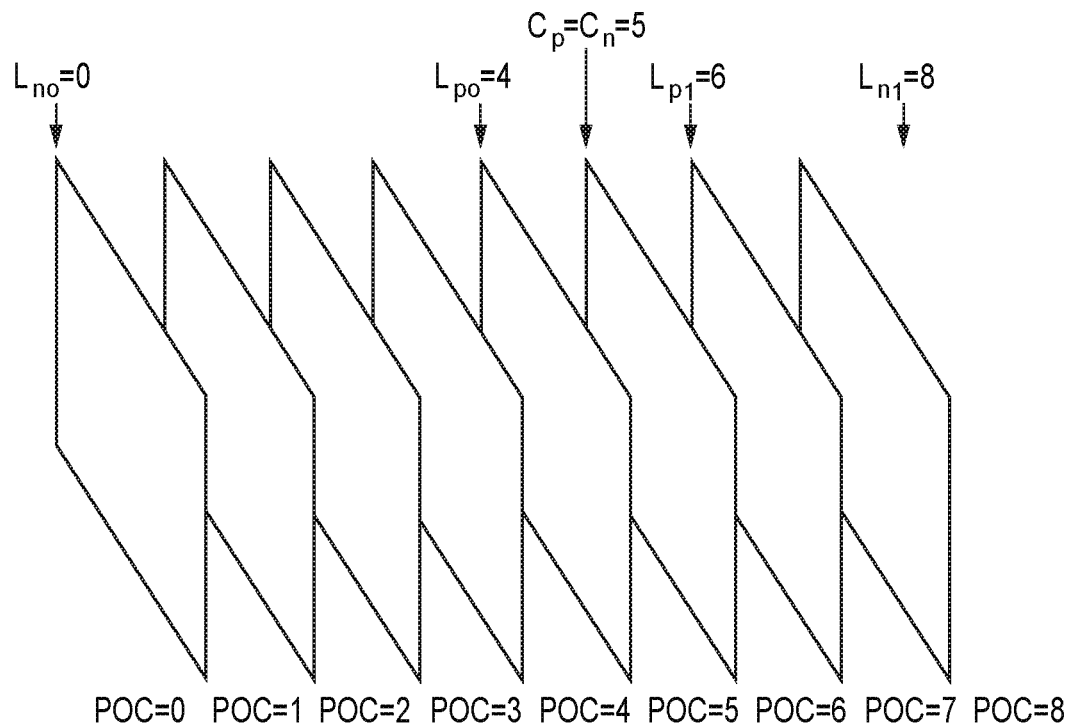
FIG. 19 is a diagram for describing an embodiment.
FIG. 20 is a diagram for describing an embodiment.

In FIG. 19, "$C_p$" represents a current frame of the prediction target block, "Cn" represents a current frame of the adjacent block, and Picture Order Counts (POC) of both of them are the same ("5").

Also, "$L_{p0}$" and "$L_{p1}$" represent two reference frames of the prediction target block, and "$L_{n0}$" and "$L_{n1}$" represent two reference frames of the adjacent block.

Note that, in the table of FIG. 20, only one POC is described for each of "$L_{p0}$", "$L_{p1}$", "$L_{n0}$", and "$L_{n1}$". However, these are POCs indicated by the reference image list and the reference image index superimposed on the encoded data, and POCs of each of "$L_{p0}$", "$L_{p1}$", "$L_{n0}$", and "$L_{n1}$" is not necessarily one. However, while the number of the reference frame(s) can be freely set by the designer, POC is uniquely determined by the reference image list and the reference image index.

Herein, in order to convert the prediction direction of the adjacent block from the bidirectional prediction to the unidirectional prediction, the reference frame of the adjacent block has to be uniquely selected. However, hereinafter, methods depending on the correlations between the current frame of the prediction target block, the reference frame of the prediction target block, and the reference frame of the adjacent block will be described.

In Method 1, the OBMC application determination unit 34*b*2 is configured to compare the absolute values of the differences between POCs of the current frame $C_p$ of the prediction target block and each of the two reference frames $L_{n0}/L_{n1}$ of the adjacent blocks.

For example, like the examples of FIG. 19 and FIG. 20, if POC of the current frame $C_p$ of the prediction target block is "5", POC of the reference frame $L_{n0}$ of the adjacent block is "0", and POC of the reference frame $L_{n1}$ of the adjacent block is "8", $|C_p-L_{n0}|=5$ and $|C_p-L_{n1}|=3$ are obtained. Therefore, the OBMC application determination unit 34*b*2 selects the reference frame $L_{n1}$ of the adjacent block.

This method is based on an idea that the smaller the absolute value of the difference in POCs, the higher the prediction accuracy.

In other words, in Method 1, the OBMC application determination unit 34*b*2 is configured to select the one that has the smaller absolute value of the POC difference between the current frame $C_p$ of the prediction target block and the reference frame $L_{n0}/L_{n1}$ of the adjacent block and determine that the unidirectional prediction using the selected reference frame $L_{n1}$ of the adjacent block is applied to the adjacent block.

The OBMC application determination unit 34*b*2 is configured to compare the absolute values of the differences between POCs of the reference frames $L_{p0}/L_{p1}$ of the prediction target block and the reference frames $L_{n0}/L_{n1}$ of the adjacent block.

For example, like the examples of FIG. 19 and FIG. 20, if POCs of the reference frames $L_{p0}/L_{p1}$ of the prediction target block are "4"/"6", and POCs of the reference frames $L_{n0}/L_{n1}$ of the adjacent block are "0"/"8", $|L_{p0}-L_{n0}|=4$, $|L_{p0}-L_{n1}|=4$, $|L_{p1}-L_{n0}|=6$, and $|L_{p1}-L_{n1}|=2$ are obtained. Therefore, if the prediction target block has the reference frame $L_{p1}$, the OBMC application determination unit 34*b*2 selects the reference frame $L_{n1}$ of the adjacent block with which the absolute value of the POC difference is small.

Herein, if the prediction target block has the reference frame $L_{p0}$, the absolute values of the POC differences are equal between the reference frames $L_{n0}/L_{n1}$ of the adjacent block; therefore, the reference frame of the adjacent block is uniquely determined by a later-described selection method.

This method is based on an idea that the smaller the absolute value of the difference in POCs, the higher the prediction accuracy.

In other words, in Method 2, the OBMC application determination unit 34*b*2 is configured to select the one that has the smaller absolute value of the POC difference between the reference frames $L_{p0}/L_{p1}$ of the prediction target block and the reference frames $L_{n0}/L_{n1}$ of the adjacent block and determine that the unidirectional prediction using the selected reference frame $L_{n1}$ of the adjacent block is applied to the adjacent block.

In Method 3, the OBMC application determination unit 34*b*2 is configured to carry out selection by comparing the absolute values of the differences between POCs of the reference frames $L_{p0}/L_{p1}$ of the prediction target block and the reference frames $L_{n0}/L_{n1}$ of the adjacent block.

For example, like the examples of FIG. 19 and FIG. 20, if POCs of the reference frames $L_{p0}/L_{p1}$ of the prediction target block are "4"/"6", and POCs of the reference frames $L_{n0}/L_{n1}$ of the adjacent block are "0"/"8", $|L_{p0}-L_{n0}|=4$, $|L_{p0}-L_{n1}|=4$, $|L_{p1}-L_{n0}|=6$, and $|L_{p1}-L_{n1}|=2$ are obtained. Therefore, if the prediction target block has the reference frame $L_{p1}$, the OBMC application determination unit 34*b*2 selects the reference frame $L_{n0}$ of the adjacent block with which the absolute value of the POC difference is large.

Herein, if the prediction target block has the reference frame $L_{p0}$, the absolute values of the POC differences are equal between the reference frames $L_{n0}/L_{n1}$ of the adjacent block. Therefore, this is based on an idea that prediction errors easily occur in the reference frame of the adjacent block with the uniquely larger one and that it is rather better to actively apply OBMC to the block like that (block boundary) by the later-described selection method.

In other words, in Method 3, the OBMC application determination unit 34*b*2 is configured to select the one that has the larger absolute value of the POC difference between the reference frames $L_{p0}/L_{p1}$ of the prediction target block and the reference frames $L_{n0}/L_{n1}$ of the adjacent block and determine that the unidirectional prediction using the selected reference frame $L_{n1}$ of the adjacent block is applied to the adjacent block.

In Method 4, the OBMC application determination unit 34*b*2 is configured to select the reference frame of the adjacent block having the reference image list and the reference image index equal to those of the prediction target block.

In other words, in Method 4, the OBMC application determination unit 34*b*2 is configured to select the reference frame of the adjacent block equal to the reference frame of the prediction target block and determine that the unidirectional prediction using the selected reference frame of the adjacent block is applied to the adjacent block.

This method is based on the idea that, since the prediction directions of the prediction target block and the adjacent block tend to be equal when the reference frame having the reference image list and the reference image index equal to those of the prediction target block is selected for the adjacent block, prediction accuracy can be improved.

In Method 5, the OBMC application determination unit 34*b*2 is configured to select the reference frame of the adjacent block having the reference image list and the reference image index different from those of the prediction target block.

This method is based on the idea that, since the prediction directions of the prediction target block and the adjacent block tend to be different from each other if the reference frame having the reference image list and the reference image index different from those of the prediction target block is selected for the adjacent block, prediction errors caused by the influence thereof easily occur, prediction errors easily occur, and it is better to actively apply OBMC to the block like this (block boundary).

In Method 6, the selection method in the case in which the absolute values are equal in the comparison of the absolute values of the POC differences between the current frame $C_p$ of the prediction target block and the reference frames $L_{n0}/L_{n1}$ of the adjacent block will be described.

For example, in a case in which the absolute values of the POC differences between the current frame $C_p$ of the prediction target block and the reference frame $L_{n0}/L_{n1}$ of the adjacent block are $|C_p-L_{n0}|=A$ and $|C_p-L_{n1}|=B$, wherein A=B, the OBMC application determination unit 34$b$2 is configured to newly compare the absolute values of the POC differences between the reference frames $L_{p0}/L_{p1}$ of the prediction target block and the reference frames $L_{n0}/L_{n1}$ of the adjacent block to uniquely select the reference frame of the adjacent block.

For example, in a case in which $|L_{p0}-L_{n0}|=C$ and $|L_{p0}-L_{n1}|=D$ are obtained, wherein C<D, when the prediction target block has the reference frame $L_{P0}$, the OBMC application determination unit 34$b$2 is configured to select $L_{n0}$ having a smaller absolute value as the reference frame of the adjacent block.

In Method 7, the selection method in the case in which the absolute values are equal in the comparison of the absolute values of the POC differences between the reference frames $L_{p0}/L_{p1}$ of the prediction target block and the reference frames $L_{n0}/L_{n1}$ of the adjacent block will be described.

For example, in a case in which the absolute values of the POC differences between the reference current frames $L_{p0}/L_{p1}$ of the prediction target block and the reference frame $L_{n0}/L_{n1}$ of the adjacent block are $|L_{p0}-L_{n0}|=X$ and $|L_{p0}-L_{n1}|=Y$, wherein X=Y, the OBMC application determination unit 34$b$2 is configured to newly compare the absolute values of the POC differences between the current frame $C_p$ of the prediction target block and the reference frames $L_{n0}/L_{n1}$ of the adjacent block to uniquely select the reference frame of the adjacent block.

For example, in a case in which $|C_p-L_{n0}|=U$ and $|C_p-L_{n1}|=V$ are obtained, wherein U<V, the OBMC application determination unit 34$b$2 is configured to select $L_{n0}$ having the smaller absolute value as the reference frame of the adjacent block.

In Method 8, the OBMC application determination unit 34$b$2 is configured to select $L_{n0}$ (or $L_{n1}$), which is determined in advance, as the reference frame of the adjacent block if the absolute values are equal in the comparison of the absolute values of the POC differences between the reference frame of the prediction target block and the reference frame of the adjacent block.

Also, in Method 8, the OBMC application determination unit 34$b$2 may be configured to select $L_{n0}$ (or $L_{n1}$), which is determined in advance, as the reference frame of the adjacent block regardless of the result of the comparison of the absolute values of the POC differences between the reference frame of the prediction target block and the reference frame of the adjacent block.

Note that the OBMC application determination unit 34$b$2 may be configured to determine whether to apply OBMC or not by the prediction target sub block unit, which are obtained by dividing the prediction target block, as described in Algorithm Description of Joint Exploration Test Model 7 (JEM 7) instead of the prediction target block unit.

Figure 21:
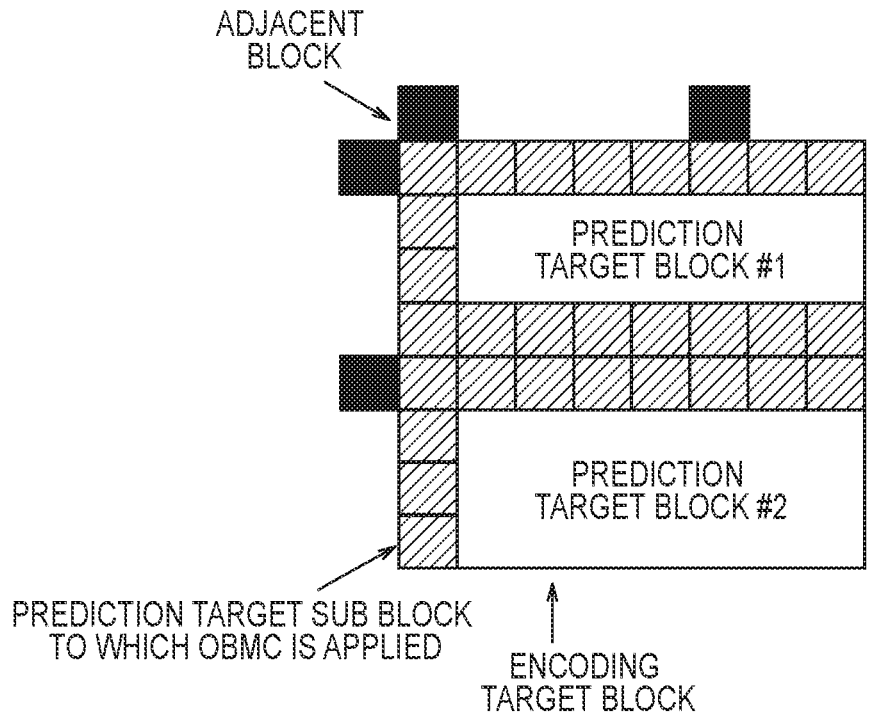
FIG. 21 is a diagram for describing an embodiment.
Figure 22:
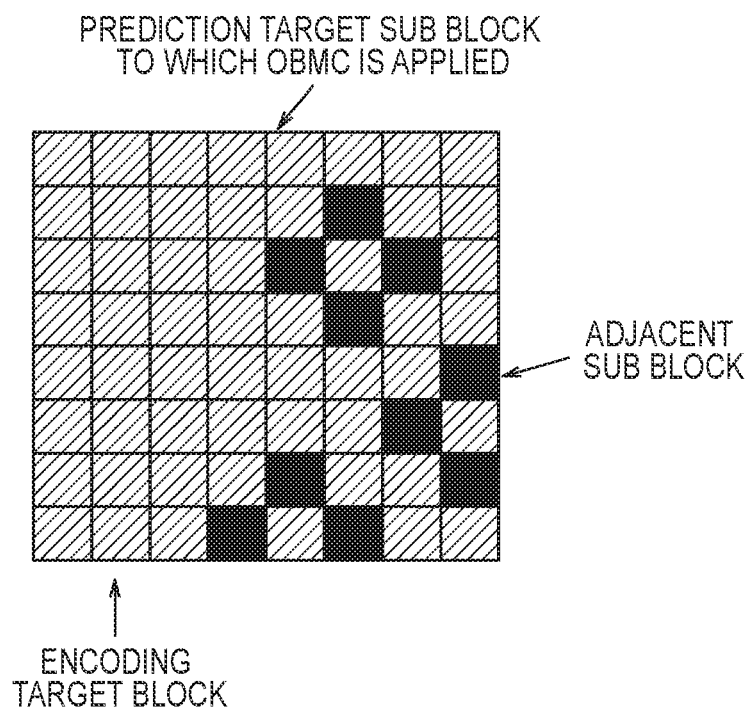
FIG. 22 is a diagram for describing an embodiment.

FIG. 21 and FIG. 22 illustrate case examples of determination about whether to apply OBMC or not and dividing of prediction target blocks into prediction target sub blocks as processing units for application of OBMC.

In the example of FIG. 21, an encoding target block includes two prediction target blocks #1/#2 (16×32 units). Herein, the OBMC application determination unit 34$b$2 divides boundaries of the prediction target blocks #1/#2 into the prediction target sub blocks in 4×4 units and determines whether to apply OBMC to the prediction target sub blocks or not.

Herein, if the adjacent block has a motion vector different from that of the prediction target block, as described above, applicability of OBMC is determined; and, if it is determined that OBMC is to be applied, the boundary of the prediction target block is smoothed by OBMC, prediction errors are reduced, and objective performance is improved as a result.

The example of FIG. 22 illustrates a case in which prediction target blocks have different motion vectors in an encoding target block.

Examples of the cases in which the prediction target blocks have different motion vectors in the encoding target block include cases to which the Alternative Temporal Motion Vector Prediction (ATMVP) mode proposed in Algorithm Description of Joint Exploration Test Model 7 (JEM 7), an AFFINE mode, and a Frame-Rate-Up Conversion (FRUC) mode are applied.

In such cases, an application determination region of OBMC with respect to the prediction target block ranges not only to the prediction target block boundary, but also to the prediction target sub block boundary. In such a case, the memory bandwidth and calculation load required are increased compared with the case in which OBMC is applied only to the boundary of the prediction target block. Therefore, as described above, a method such as reducing the number of application lines of OBMC can be employed.

Hereinafter, a sixth embodiment of the present invention will be described by focusing on differences from the above described embodiments and modification examples. In the present embodiment, a determination method of a weight value of a weight coefficient matrix used in OBMC application will be described.

First, the size of the weight coefficient matrix is determined by a region to which OBMC is applied with respect to the prediction target block.

For example, in a case in which OBMC is applied by an amount corresponding to 4 lines (4×4 prediction target sub block unit) from the prediction target block boundary, the weight coefficient matrix corresponds to 4 lines (4×4).

Secondly, the weight value of the weight coefficient matrix about a reference pixel value of the prediction target block and a reference pixel value of the adjacent block is determined based on the ratio of the distance from the prediction target block boundary. In a case in which OBMC is applied, the weight values of the reference pixel values of the prediction target blocks are (3/4, 7/8, 15/16, 31/32) in the order of those close to the prediction target block boundary, and the reference pixel values of the adjacent blocks are (1/4, 1/8, 1/16, 1/32) in the order of those close to the prediction target block boundary.

On the other hand, in a case in which the upper/left or upper/lower/left/right boundaries of the prediction sub block are targets of OBMC, the weight value of the weight coefficient matrix may be changed based on the number of adjacent blocks.

However, since OBMC is not applied in the case in which the adjacent block has the motion vector and the reference frame which are the same as those of the prediction target sub block, only the adjacent blocks having the motion vectors or the reference frames which are different from those of the prediction target sub block are counted for the number of adjacent blocks.

For example, in a case in which the prediction target sub block has upper/left adjacent blocks serving as targets of OBMC, the weight values of the reference pixel values of the prediction target blocks are (2/4, 6/8, 14/16, 30/32) in the order of those close to the prediction target block boundary, the weight values of the reference pixel values of the upper adjacent blocks are (1/4, 1/8, 1/16, 1/32) in the order of those close to the prediction target block boundary, and the weight values of the reference pixel values of the left adjacent blocks are (1/4, 1/8, 1/16, 1/32) in the order of those close to the prediction target block boundary.

This is for causing the weight values to be constant regardless of the processing order since, if the upper adjacent block and the left adjacent block are subjected to weighted averaging separately with respect to the prediction target block with the weight values (1/4, 1/8, 1/16, 1/32), the weight values applied are changed depending on the order of processing.

Also, hereinafter, a method of determining the applied weight value based on the sizes of the prediction target block and the adjacent block will be described.

In the conventional method described in Algorithm Description of Joint Exploration Test Model 7 (JEM 7), the weight value of the weighting matrix carries out weighting based on the distance from the prediction target block boundary. However, in a case in which the size of the prediction target block is large, it is highly possible to be a flat image, and, therefore, it is considered that the weighting ratio of the reference pixel values of the prediction target block and the adjacent block in weighted averaging with OBMC is preferred to be smaller.

On the other hand, in a case in which the size of the prediction target block is small, it is highly possible that the image includes complex patterns or edges, and, therefore, it is considered that increasing the weighting ratio of the prediction target block and the adjacent block and saving the edge are preferred.

In the present embodiment, the OBMC application unit 34b3 is configured to change the weight value of the weight coefficient matrix used in weighted averaging in OBMC based on the number of the adjacent blocks or the size of the prediction target block.

Hereinafter, with reference to FIG. 23, a seventh embodiment of the present invention will be described by focusing on differences from the above described embodiments and modification examples. In the present embodiment, the MC prediction unit 34b which corrects the application condition of the deblocking filter in OBMC application will be described.

The deblocking filter employed in ITU-T H.265 High Efficiency Video Coding is known to have an effect of smoothing block boundaries, and boundary strength (BS value: Boundary Strength value) is used as 1 of the application determination thereof.

For example, in HEVC, as illustrated in FIG. 23, the BS value is defined for each of the conditions of the two blocks between which a block boundary is interposed. It is known that the deblocking filter is not applied to the block boundary if the BS value is "0" and that the deblocking filter is applied to the block boundary if the BS value is "1" or higher.

Herein, as described above, OBMC is configured to smooth the block boundary by subjecting the reference pixel values indicated by motion vectors within the reference frame to weighted averaging if the prediction target block and the adjacent block have different motion vectors.

Therefore, when the deblocking filter is applied after OBMC is applied, block boundaries are smoothed doubly, and the vicinities of the boundaries may unintentionally become too flat.

Therefore, in order to prevent unintentional double smoothing by the deblocking filter in the case in which OBMC is applied, the BS value is corrected as illustrated in FIG. 23 in order to determine applicability of the deblocking filter.

In FIG. 23, in the cases in which OBMC is applied, the BS values in Condition 3 and Condition 4 are corrected.

In Condition 3 and Condition 4, occurrence causes of block distortion which occur at block boundaries are a difference in the motion vectors of two blocks, a difference in reference images of motion compensation of two blocks, and a difference in the number of motion vectors of two blocks.

Therefore, the present embodiment is based on the idea that, if OBMC which is basically applied in the case in which the two blocks between which the block boundary is interposed have different motion vectors has already been applied to the block boundary, double smoothing by the deblocking filter may be prohibited by changing the BS value to "0" under Condition 3 and Condition 4.

In other words, in the present embodiment, the OBMC application unit 34b3 is configured to change the application condition of the deblocking filter based on whether OBMC is to be applied or not.

Hereinafter, an eighth embodiment of the present invention will be described by focusing on differences from the above described embodiments and modification examples. In the present embodiment, as a method of reducing the memory bandwidth and the number of times of calculations in OBMC application, the MC prediction unit 34b configured to reduce the number of the motion vectors and the reference frames, which are required in OBMC, by a predetermined reducing method in a case in which the motion vectors of the adjacent blocks of the prediction target block are different will be described.

In the case in which the adjacent blocks of the prediction target block have different motion vectors, the memory bandwidth and the number of times of calculations required in OBMC application of the prediction target block increase by the number of the adjacent blocks.

Therefore, in the case in which the adjacent blocks have different motion vectors, for example, following methods of reducing the number of the motion vectors and the reference frames required in OBMC application are conceivable.

A method of merging the adjacent blocks having different motion vectors into a predetermined block size (for example, merging 4×4 adjacent blocks into 4×8 adjacent blocks or 8×4 adjacent blocks).

A method of thinning the adjacent blocks used in OBMC application if the adjacent blocks having different motion vectors are juxtaposed (for example, if 4 4×4 adjacent blocks are juxtaposed above 16×16 prediction target blocks, two of them, i.e., the left end and the third one from the left end are used or the adjacent blocks of the left end and the right end are used as the adjacent blocks used in OBMC application).

Also, the above described merging method and the thinning method of the adjacent blocks may be determined by using threshold values.

For example, if the difference in the motion vectors of the adjacent blocks having different motion vectors is less than one pixel, these are handled as the adjacent blocks which have the same motion vectors.

Also, the threshold value of the difference in the motion vectors may be changed based on whether the unidirectional prediction or the bidirectional prediction is applied to the adjacent block. For example, less than 1.5 pixel can be used in the case in which the unidirectional prediction is applied, and less than 1 pixel can be used in the case in which the bidirectional prediction is applied, and the like).

In other words, in the present embodiment, the OBMC application unit 34*b*3 is configured to reduce the number of the motion vectors and the reference frames, which are required in OBMC, by the predetermined reducing method if the motion vector of the prediction target block and the motion vector of the adjacent block are different.

Also, the image encoding device 10 and the image decoding device 30 described above may be realized by a program which causes a computer to execute functions (processes).

Note that the above described embodiments have been described by taking application of the present invention to the image encoding device 10 and the image decoding device 30 as examples. However, the present invention is not limited only thereto, but can be similarly applied to an encoding/decoding system having functions of the image encoding device 10 and the image decoding device 30.

What is claimed is:

1. An image decoding device configured to decode an image signal including a plurality of blocks, the image decoding device comprising:
    a first circuit that generates a prediction image signal of a prediction target block based on information about a motion vector in a unit of the block and a reference frame;
    a second circuit that carries out an overlapped block motion compensation process of correcting the prediction image signal of the prediction target block by subjecting the prediction image signal of the prediction target block and a prediction image signal generated based on information about a motion vector and a reference frame of an adjacent block of the prediction target block to weighted averaging; and
    a third circuit that determines whether the overlapped block motion compensation process is to be applied to the prediction target block or not, wherein
    the third circuit determines to apply the overlapped block motion compensation process to the prediction target block, when unidirectional prediction is applied to the adjacent block.

2. The image decoding device according to claim 1, wherein
    the third circuit determines to apply the overlapped block motion compensation process to the prediction target block when unidirectional prediction is applied to the prediction target block.

3. The image decoding device according to claim 1, wherein
    the third circuit determines to apply the overlapped block motion compensation process to the prediction target block when a size of the prediction target block is equal to or higher than a predetermined threshold value.

4. An image decoding method of decoding an image signal including a plurality of blocks, the image decoding method comprising:
    a process A of generating a prediction image signal of a prediction target block based on information about a motion vector in a unit of the block and a reference frame;
    a process B of carrying out an overlapped block motion compensation process of correcting the prediction image signal of the prediction target block by subjecting the prediction image signal of the prediction target block and a prediction image signal generated based on information about a motion vector and a reference frame of an adjacent block of the prediction target block to weighted averaging; and
    a process C of determining whether the overlapped block motion compensation process is to be applied to the prediction target block or not, wherein
    in the process C, determination to apply the overlapped block motion compensation process to the prediction target block if unidirectional prediction is applied to the adjacent block is carried out.

5. A program stored on a non-transitory computer readable medium with instructions thereon that, when executed, causes a computer to function as an image decoding device configured to decode an image signal including a plurality of blocks, wherein
    the image decoding device comprises:
    a first circuit that generates a prediction image signal of a prediction target block based on information about a motion vector in a unit of the block and a reference frame;
    a second circuit that carries out an overlapped block motion compensation process of correcting the prediction image signal of the prediction target block by subjecting the prediction image signal of the prediction target block and a prediction image signal generated based on information about a motion vector and a reference frame of an adjacent block of the prediction target block to weighted averaging; and
    a third circuit that determines whether the overlapped block motion compensation process is to be applied to the prediction target block or not, wherein
    the third circuit determines to apply the overlapped block motion compensation process to the prediction target block if unidirectional prediction is applied to the adjacent block.

* * * * *